United States Patent
Noguchi et al.

(10) Patent No.: US 10,948,243 B2
(45) Date of Patent: Mar. 16, 2021

(54) CHEMICAL HEAT STORAGE APPARATUS

(71) Applicant: KABUSHIKI KAISHA TOYOTA JIDOSHOKKI, Aichi (JP)

(72) Inventors: Yukihiro Noguchi, Aichi (JP); Hiroyasu Kawauchi, Aichi (JP); Kenji Mori, Aichi (JP); Takafumi Mizuno, Aichi (JP); Yoshihiro Katagiri, Aichi (JP); Satoshi Hariu, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 65 days.

(21) Appl. No.: 16/063,927

(22) PCT Filed: Dec. 1, 2016

(86) PCT No.: PCT/JP2016/085753
§ 371 (c)(1),
(2) Date: Jun. 19, 2018

(87) PCT Pub. No.: WO2017/110405
PCT Pub. Date: Jun. 29, 2017

(65) Prior Publication Data
US 2018/0372422 A1    Dec. 27, 2018

(30) Foreign Application Priority Data

Dec. 24, 2015  (JP) .............................. JP2015-251576
Aug. 23, 2016  (JP) .............................. JP2016-163019

(51) Int. Cl.
*F28D 20/00* (2006.01)
*F01N 5/02* (2006.01)
(Continued)

(52) U.S. Cl.
CPC ........... *F28D 20/003* (2013.01); *F01M 5/001* (2013.01); *F01M 5/021* (2013.01); *F01N 3/208* (2013.01);
(Continued)

(58) Field of Classification Search
CPC .... F01M 5/001; F01M 5/021; F01N 13/0097; F01N 13/087; F01N 2240/02;
(Continued)

(56) References Cited

U.S. PATENT DOCUMENTS 8,800,502 B2 *  8/2014  Choi ........................ F01P 11/00
                                                          123/198 D
10,001,327 B2 *  6/2018  Fuse ........................ C09K 5/02
(Continued)

FOREIGN PATENT DOCUMENTS

JP      2010-90786      4/2010
JP      2010-230268    10/2010
(Continued)

OTHER PUBLICATIONS

International Search Report in International Patent Application No. PCT/JP2016/085753, dated Feb. 28, 2017.
(Continued)

*Primary Examiner* — Anthony Ayala Delgado
(74) *Attorney, Agent, or Firm* — Greenblum & Bernstein, P.L.C.

(57) ABSTRACT

Provided is a chemical heat storage apparatus that includes a reactor that exchanges heat with a heating object and includes a reaction material generating heat via chemical reaction with a reaction medium, the reaction medium being desorbed from the reaction material when heat is given, a reservoir storing the reaction medium, a reaction medium flow system allowing the reaction medium to flow between the reactor and the reservoir, a heat generation control unit
(Continued)

US 10,948,243 B2
Page 2 controlling the reaction medium flow system, and an exhaust gas utilization unit desorbing the reaction medium from the reaction material via heat of exhaust gas discharged from an internal combustion engine and heating the heating object via the heat of the exhaust gas when a temperature of the exhaust gas reaches a predetermined temperature or more.

10 Claims, 14 Drawing Sheets

(51) Int. Cl.

| | | |
|---|---|---|
| *F01M 5/02* | (2006.01) | |
| *F16N 39/04* | (2006.01) | |
| *F28D 21/00* | (2006.01) | |
| *F01N 13/00* | (2010.01) | |
| *F01M 5/00* | (2006.01) | |
| *F01N 3/20* | (2006.01) | |
| *F01N 3/28* | (2006.01) | |
| *F01N 13/08* | (2010.01) | |

(52) U.S. Cl.
CPC ............ *F01N 3/2892* (2013.01); *F01N 5/02* (2013.01); *F01N 13/0097* (2014.06); *F01N 13/087* (2013.01); *F16N 39/04* (2013.01); *F28D 21/0003* (2013.01); *F01N 2240/02* (2013.01); *F01N 2610/02* (2013.01); *F16N 2200/10* (2013.01); *F16N 2250/08* (2013.01); *F28D 2020/0021* (2013.01); *Y02E 60/14* (2013.01); *Y02T 10/12* (2013.01)

(58) Field of Classification Search
CPC .... F01N 2610/02; F01N 3/208; F01N 3/2892; F01N 5/02; F28D 2020/0021; F28D 20/003; F28D 21/0003; Y02E 60/142; Y02T 10/16

See application file for complete search history.

(56) References Cited

U.S. PATENT DOCUMENTS

| | | | |
|---|---|---|---|
| 10,309,364 B2* | 6/2019 | Gu | ............... F01N 5/02 |
| 2014/0374058 A1 | 12/2014 | Greiner et al. | |
| 2015/0144304 A1* | 5/2015 | Schneider | ............. B22D 41/01 |
| | | | 165/104.17 |
| 2015/0192049 A1* | 7/2015 | Suzuki | ................... F25B 17/08 |
| | | | 60/300 |

FOREIGN PATENT DOCUMENTS

| | | |
|---|---|---|
| JP | 2010-265812 | 11/2010 |
| JP | 2015-215155 | 12/2015 |
| WO | 2015/174243 | 11/2015 |

OTHER PUBLICATIONS

Official Communication issued in counterpart European Patent Application No. 16878298.5, dated Dec. 3, 2018.

\* cited by examiner (a)

(b)

CHEMICAL HEAT STORAGE APPARATUS

TECHNICAL FIELD

The present invention relates to a chemical heat storage apparatus.

BACKGROUND ART

The chemical heat storage apparatus that is disclosed in Patent Literature 1 is known as one of chemical heat storage apparatuses according to the related art. The chemical heat storage apparatus disclosed in Patent Literature 1 has a condensation container storing liquid water and a reaction container storing a heat storage material that generates heat by a chemical reaction with water and absorbs heat by a dehydration reaction. At an engine oil temperature of 40° C. or less, for example, the water stored in the condensation container heads to the reaction container through a first flow path and is sprayed from a nozzle to the heat storage material in the reaction container. Then, the heat storage material generates heat (heat generation reaction) by a chemical reaction and the engine oil is heated by the thermal energy thereof. When the engine oil has a high temperature, water vapor is generated (regeneration reaction) from the heat storage material by a dehydration reaction and the water vapor, condensed and turned into liquid water, returns to the condensation container through a second flow path.

CITATION LIST

Patent Literature

Patent Literature 1: Japanese Unexamined Patent Publication No. 2010-230268

SUMMARY OF INVENTION

Technical Problem

Although the heat storage material (reaction material) is regenerated by the heat of engine oil in the related art described above, the amount of heat for heat storage material regeneration is insufficient with the heat of engine oil alone and insufficient heat storage material regeneration may arise in that case. Although the engine oil (heating object) is heated by the heat that is generated from a chemical reaction between the water and the heat storage material in the related art described above, sufficient engine oil heating may be impossible with the heat generated from the chemical reaction between the water and the heat storage material alone.

An object of the present invention is to provide a chemical heat storage apparatus with which a reaction material can be sufficiently regenerated and a heating object can be sufficiently heated.

Solution to Problem

An aspect of the present invention relates to a chemical heat storage apparatus provided in a mobile machine in which an internal combustion engine is mounted and heating a heating object. The chemical heat storage apparatus includes a reactor disposed capable of exchanging heat with the heating object and including a reaction material generating heat by a chemical reaction with a reaction medium when the reaction medium is supplied, the reaction medium being desorbed from the reaction material when heat is given, a reservoir storing the reaction medium, a reaction medium flow system allowing the reaction medium to flow between the reactor and the reservoir, a heat generation control unit controlling the reaction medium flow system such that heat is generated by a chemical reaction between the reaction medium and the reaction material and the heating object is heated when the internal combustion engine is started, and an exhaust gas utilization unit desorbing the reaction medium from the reaction material by using heat of exhaust gas discharged from the internal combustion engine and heating the heating object by using the heat of the exhaust gas when a temperature of the exhaust gas reaches a predetermined temperature or more.

In the chemical heat storage apparatus as described above, so-called regeneration of the reaction material, during which the reaction medium is desorbed from the reaction material by means of the heat of high-temperature exhaust gas, is performed when the temperature of the exhaust gas reaches a predetermined temperature or more. Accordingly, regeneration of the reaction material can be sufficiently performed. In addition, the heating object is heated with the heat generated from a chemical reaction between the reaction medium and the reaction material when the internal combustion engine has been started and the heating object is heated with the heat of high-temperature exhaust gas when the temperature of the exhaust gas reaches a predetermined temperature or more. Accordingly, the heating object can be sufficiently heated.

The chemical heat storage apparatus may further include a temperature detection unit detecting the temperature of the exhaust gas discharged from the internal combustion engine. The exhaust gas utilization unit may include an exhaust gas supply system supplying the exhaust gas toward the reactor from an exhaust passage connected to the internal combustion engine and an exhaust gas supply control unit controlling the exhaust gas supply system such that the reaction medium is desorbed from the reaction material by the heat of the exhaust gas and the heating object is heated when the temperature of the exhaust gas detected by the temperature detection unit reaches the predetermined temperature or more. In this case, regeneration of the reaction material and heating of the heating object are performed by exhaust gas being directly used, and thus the configuration of the exhaust gas utilization unit can be simplified.

The reactor may include a reaction material-filled portion filled with the reaction material, a heating object passage portion through which the heating object passes, the heating object passage portion being disposed adjacent to the reaction material-filled portion, and an exhaust gas passage portion through which the exhaust gas passes, the exhaust gas passage portion being disposed adjacent to the reaction material-filled portion and the heating object passage portion. The exhaust gas supply system may supply the exhaust gas from the exhaust passage to the exhaust gas passage portion. In this case, the exhaust gas passage portion is disposed adjacent to the reaction material-filled portion and the heating object passage portion, and thus regeneration of the reaction material and heating of the heating object by the heat of exhaust gas can be efficiently performed.

The reactor may include a reaction material-filled portion filled with the reaction material, a heating object passage portion through which the heating object passes, the heating object passage portion being disposed adjacent to the reaction material-filled portion, and an exhaust gas passage portion through which the exhaust gas passes, the exhaust gas passage portion being disposed adjacent to the reaction material-filled portion on a side opposite to the heating object passage portion across the reaction material-filled portion. The exhaust gas supply system may supply the exhaust gas from the exhaust passage to the exhaust gas passage portion. In this case, an excessive rise in heating object temperature attributable to the heat of exhaust gas is suppressed.

The reactor may include a reaction material-filled portion filled with the reaction material and a heating object passage portion through which the heating object passes, the heating object passage portion being disposed adjacent to the reaction material-filled portion. The exhaust gas utilization unit may include a cover covering the reactor. The exhaust gas supply system may supply the exhaust gas from the exhaust passage into the cover. In this case, the reactor does not have to be provided with an exhaust gas passage portion through which exhaust gas passes, and thus the structure of the reactor can be simplified.

The chemical heat storage apparatus may further include a temperature detection unit detecting the temperature of the exhaust gas discharged from the internal combustion engine. The exhaust gas utilization unit may include a heat exchanger performing heat exchange between the exhaust gas and a heat medium, a heat medium circulation system circulating the heat medium between the heat exchanger and the reactor, and a heat medium circulation control unit controlling the heat medium circulation system such that the reaction medium is desorbed from the reaction material by heat of the heat medium and the heating object is heated when the temperature of the exhaust gas detected by the temperature detection unit reaches the predetermined temperature or more. In this case, regeneration of the reaction material and heating of the heating object can be performed by the use of the heat medium containing no hazardous substance. In addition, the path of the heat medium circulation system can be shortened by the heat exchanger being disposed close to the reactor.

The reactor may include a reaction material-filled portion filled with the reaction material and a heating object passage portion through which the heating object passes, the heating object passage portion being disposed adjacent to the reaction material-filled portion. The heat medium circulation system may have a pipe through which the heat medium flows. A part of the pipe may pass through the reaction material-filled portion. In this case, a part of the pipe through which the heat medium flows passes through the reaction material-filled portion, and thus regeneration of the reaction material by the heat medium can be efficiently performed.

The reactor may be arranged on an exhaust passage connected to the internal combustion engine and include an exhaust gas passage portion through which the exhaust gas passes. The exhaust gas utilization unit may be the exhaust gas passage portion. In this case, regeneration of the reaction material and heating of the heating object are performed by the exhaust gas flowing through the exhaust passage being directly used, and thus the temperature of the heating object can be effectively raised. In addition, the exhaust gas supply system is unnecessary, and thus the configuration of the exhaust gas utilization unit can be sufficiently simplified. Furthermore, exhaust gas supply control does not have to be performed, and thus control processing can be simplified.

The reactor may further include a plurality of reaction material-filled portions filled with the reaction material and heating object passage portions through which the heating object passes, the heating object passage portions being disposed adjacent to the reaction material-filled portions. The exhaust gas passage portion may be disposed adjacent to the reaction material-filled portion on a side opposite to the heating object passage portion across the reaction material-filled portion. In this case, an excessive rise in heating object temperature attributable to the heat of exhaust gas is suppressed.

Advantageous Effects of Invention

According to the present invention, a chemical heat storage apparatus with which a reaction material can be sufficiently regenerated and a heating object can be sufficiently heated is provided.

DESCRIPTION OF EMBODIMENTS

Figure 1:
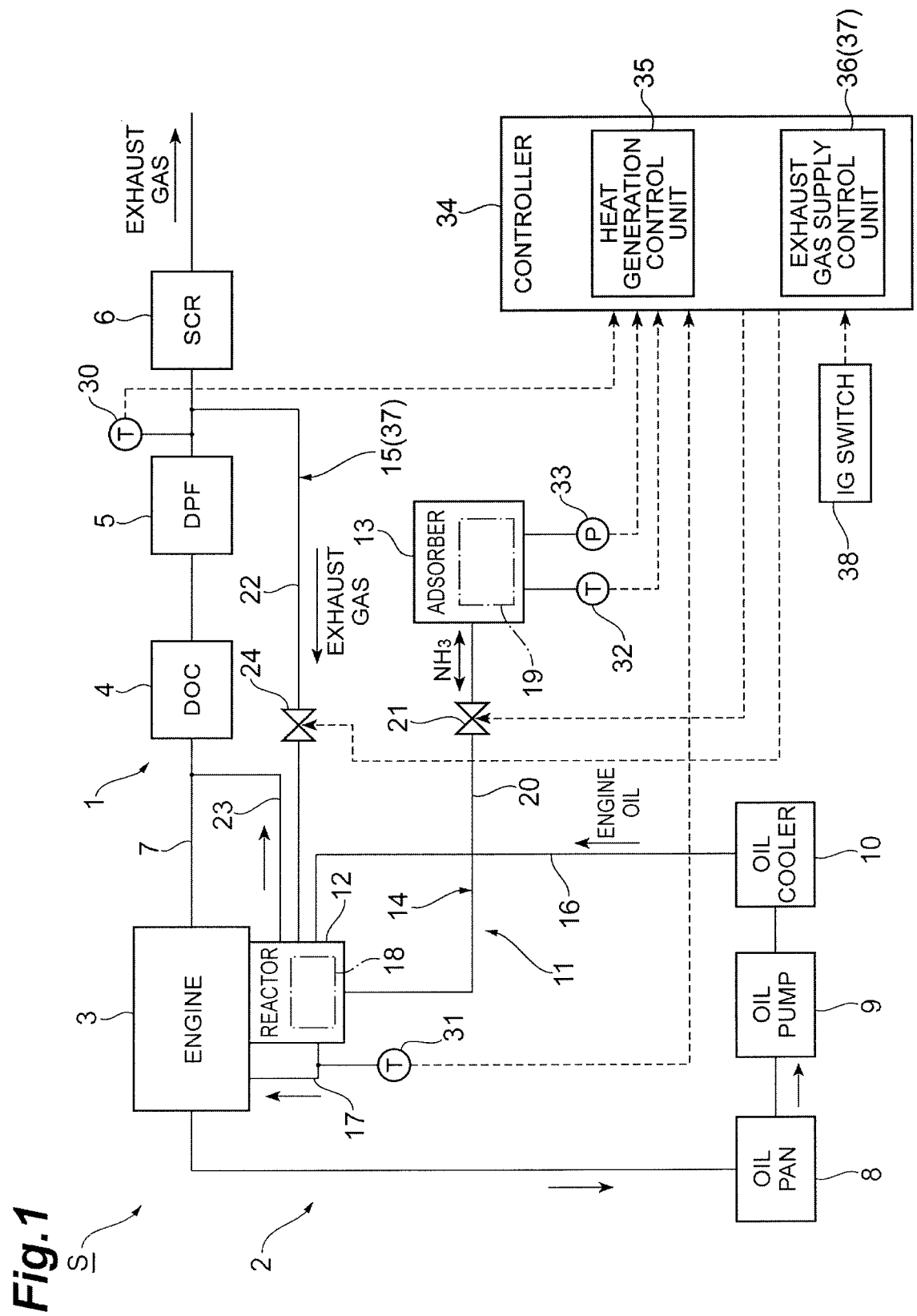
FIG. 1 is a schematic configuration diagram illustrating an exhaust purification system and an engine oil circulation system that is provided with a chemical heat storage apparatus according to a first embodiment of the present invention.

Hereinafter, embodiments of the present invention will be described in detail with reference to accompanying drawings. In the drawings, the same reference numerals will be used to refer to the same or equivalent elements so that duplicate description is omitted.

FIG. 1 is a schematic configuration diagram illustrating an exhaust purification system and an engine oil circulation system that is provided with a chemical heat storage apparatus according to a first embodiment of the present invention. In FIG. 1, an exhaust purification system 1 and an engine oil circulation system 2 are provided in a vehicle S in which a diesel engine 3 (hereinafter, simply referred to as an engine 3) that is an internal combustion engine is mounted.

The exhaust purification system 1 removes hazardous substances (environmental pollutants) from exhaust gas discharged from the engine 3. The exhaust purification system 1 is provided with a diesel oxidation catalyst (DOC) 4, a diesel exhaust particulate removal filter (diesel particulate filter: DPF) 5, and a selective reduction catalyst (selective catalytic reduction: SCR) 6.

The DOC 4, the DPF 5, and the SCR 6 are sequentially arranged, from an upstream side toward a downstream side, on an exhaust passage 7 connected to the engine 3. The DOC 4 removes HC, CO, and so on from the exhaust gas by oxidation. The DPF 5 collects particulate matter (PM) contained in the exhaust gas to remove the PM from the exhaust gas. The SCR 6 reduces and removes NOx from the exhaust gas by means of urea or ammonia ($NH_3$).

The engine oil circulation system 2 circulates engine oil so that each part in the engine 3 is lubricated. The engine oil circulation system 2 is provided with an oil pan 8, an oil pump 9, and an oil cooler 10. The engine oil is stored in the oil pan 8. The engine oil returns to the oil pan 8 after flowing through each part in the engine 3. The oil pump 9 suctions up the engine oil stored in the oil pan 8 and pumps the engine oil toward the engine 3. The oil cooler 10 cools the engine oil to a predetermined temperature by using a coolant when the temperature of the engine oil is excessively high. The oil cooler 10 cools the engine oil in order to prevent deterioration attributable to an excessive rise in engine oil temperature.

The engine oil circulation system 2 is also provided with a chemical heat storage apparatus 11 that allows the temperature of the engine oil to rise early. The chemical heat storage apparatus 11 heats (warms up) the engine oil without requiring external energy such as electric power. Specifically, the chemical heat storage apparatus 11 desorbs a reaction medium from a reaction material 18 (described later) of a reactor 12 by means of the heat of the exhaust gas, stores the desorbed reaction medium in an adsorber 13 (described later), causes a chemical reaction between the reaction material 18 and the reaction medium by supplying the reaction medium to the reactor 12, and heats the engine oil by means of the reaction heat at that time. In other words, the chemical heat storage apparatus 11 is an apparatus storing heat from the engine oil and supplying heat to the engine oil by using a reversible chemical reaction. In the present embodiment, the reaction medium is ammonia ($NH_3$).

The chemical heat storage apparatus 11 is provided with the reactor 12, the adsorber 13, a $NH_3$ flow system 14 (reaction medium flow system), and an exhaust gas supply system 15. The reactor 12 is attached and fixed to, for example, the outer wall surface of the engine 3. The reactor 12 is connected to the oil cooler 10 via an oil pipe 16 through which the engine oil flows and is connected to the engine 3 via an oil pipe 17 through which the engine oil flows. The reactor 12 is disposed capable of exchanging heat with the engine oil.

The reactor 12 includes the reaction material 18 generating heat by a chemical reaction with $NH_3$ when the $NH_3$ is supplied and desorbing $NH_3$ when the heat of the exhaust gas (described later) is given. A halide represented by the composition formula $MX_a$ is used as the reaction material 18. M is an alkaline earth metal such as Mg, Ca, and Sr or a transition metal such as Cr, Mn, Fe, Co, Ni, Cu, and Zn. X is, for example, Cl, Br, or I. a is a number specified by the valence of M and is 2 to 3.

The adsorber 13 is a reservoir storing $NH_3$. The adsorber 13 includes an adsorption material 19 capable of physically adsorbing and desorbing $NH_3$. Activated carbon, carbon black, mesoporous carbon, nano carbon, zeolite, or the like is used as the adsorption material 19. $NH_3$ may also be chemically adsorbed by the adsorption material 19.

The $NH_3$ flow system 14 allows $NH_3$ to flow between the reactor 12 and the adsorber 13. The $NH_3$ flow system 14 connects the reactor 12 and the adsorber 13 to each other and has a $NH_3$ pipe 20 through which $NH_3$ flows in both directions and an electromagnetic valve 21 arranged on the $NH_3$ pipe 20 and opening and closing the flow path of the $NH_3$.

The exhaust gas supply system 15 supplies exhaust gas from the exhaust passage 7 toward the reactor 12. The exhaust gas supply system 15 has an exhaust gas pipe 22 interconnecting the reactor 12 and the downstream side of the DPF 5 on the exhaust passage 7 and allowing exhaust gas to flow from the exhaust passage 7 to the reactor 12, an exhaust gas pipe 23 interconnecting the reactor 12 and the upstream side of the DOC 4 on the exhaust passage 7 and allowing exhaust gas to flow from the reactor 12 to the exhaust passage 7, and an electromagnetic valve 24 arranged on the exhaust gas pipe 22 and opening and closing the flow path of the exhaust gas.

Figure 2:
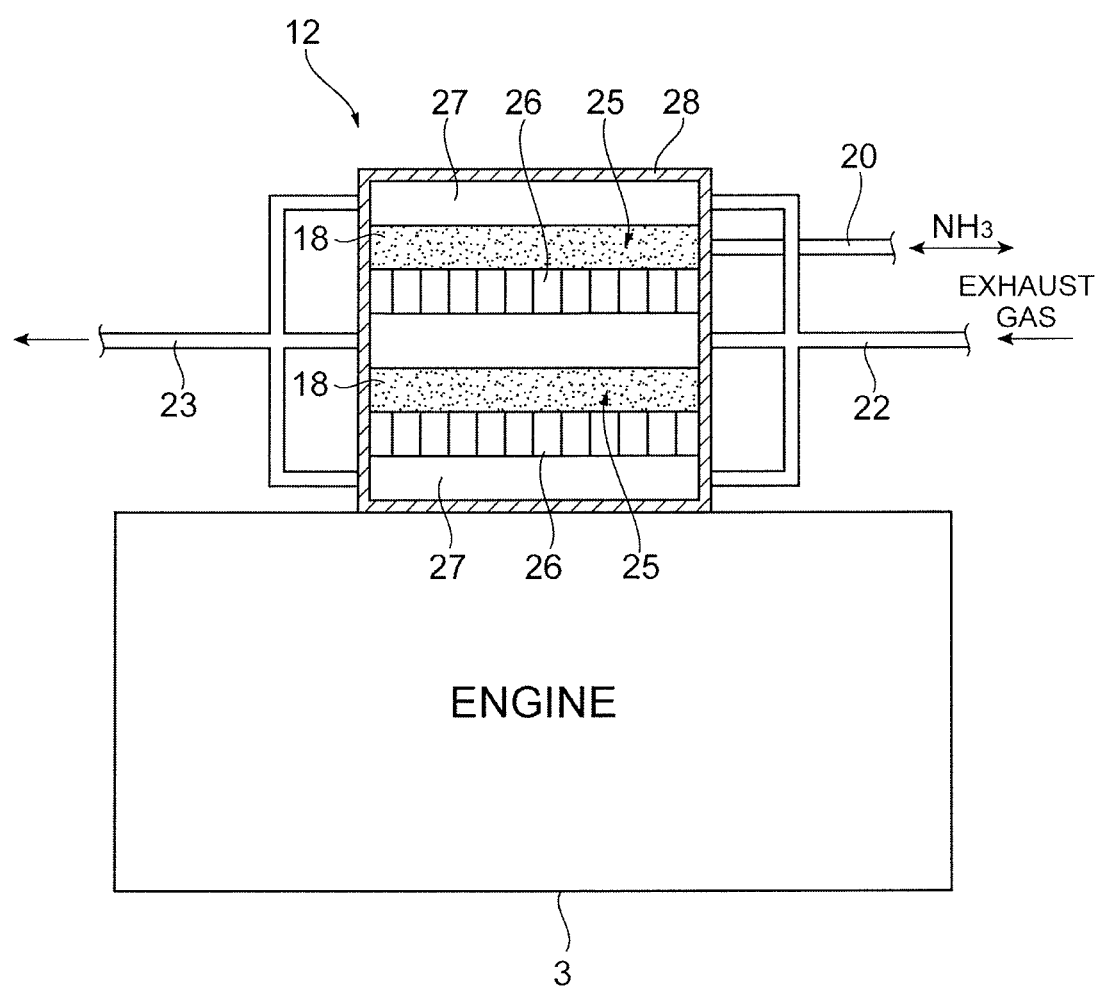
FIG. 2 is a longitudinal sectional view of a reactor illustrated in FIG. 1.

FIG. 2 is a longitudinal sectional view of the reactor 12. In FIG. 2, the reactor 12 has a rectangular parallelepiped shape. The reactor 12 has a plurality of reaction material-filled portions 25 filled with the reaction material 18, a plurality of oil passage portions 26 (heating object passage portions) through which the engine oil passes, a plurality of exhaust gas passage portions 27 through which the exhaust gas passes, and a housing 28 accommodating the reaction material-filled portions 25, the oil passage portions 26, and the exhaust gas passage portions 27. The housing 28 is formed of, for example, a metal material (such as stainless steel) that is corrosion-resistant to $NH_3$ and exhaust gas.

The reaction material-filled portions 25, the oil passage portions 26, and the exhaust gas passage portions 27 are alternately stacked. Specifically, the oil passage portion 26 is stacked on the exhaust gas passage portion 27 and the reaction material-filled portion 25 is stacked on the oil passage portion 26. The exhaust gas passage portions 27 are disposed in the upper end portion and the lower end portion of the reactor 12. The oil passage portion 26 is disposed adjacent to the reaction material-filled portion 25. At least one of the exhaust gas passage portions 27 is disposed adjacent to the reaction material-filled portion 25 and the oil passage portion 26. The uppermost exhaust gas passage portion 27 is disposed adjacent to the reaction material-filled portion 25. The lowermost exhaust gas passage portion 27 is disposed adjacent to the oil passage portion 26.

The $NH_3$ pipe 20 is connected to the housing 28. A passage (not illustrated) is disposed in the housing 28 so that $NH_3$ is supplied to each reaction material-filled portion 25. The oil passage portion 26 has a plurality of fins for promoting heat exchange between the engine oil and the reaction material 18. Although not illustrated, the oil pipes 16 and 17 are connected to each oil passage portion 26 in a branching form such that the reactor 12 is interposed. The exhaust gas passage portion 27 has a plurality of fins for promoting heat exchange of the exhaust gas with the reaction material 18 and the engine oil. The exhaust gas pipes 22 and 23 are connected to each exhaust gas passage portion 27 in a branching form such that the reactor 12 is interposed. Accordingly, the exhaust gas supply system 15 supplies exhaust gas from the exhaust passage 7 to the exhaust gas passage portion 27 of the reactor 12.

In the reactor 12, the direction in which the engine oil flows through the oil passage portion 26 and the direction in which the exhaust gas flows through the exhaust gas passage portion 27 are orthogonal to each other. The direction in which the engine oil flows and the direction in which the exhaust gas flows may be parallel to each other instead. In this case, the engine oil and the exhaust gas may flow in the same direction or in opposite directions.

Referring back to FIG. 1, in the chemical heat storage apparatus 11, $NH_3$ is desorbed from the adsorption material 19 of the adsorber 13 because of the pressure difference between the adsorber 13 and the reactor 12 and the $NH_3$ is supplied to the reactor 12 through the $NH_3$ pipe 20 once the valve 21 is opened with the temperature of the engine oil low immediately after the engine 3 is started. Then, heat is generated from a chemical reaction (chemical adsorption) between the $NH_3$ and the reaction material 18 (such as $MgBr_2$) of the reactor 12. In other words, a reaction (heat generation reaction) from the left side to the right side in the following reaction formula (A) occurs. Then, in the reactor 12, the heat generated from the reaction material 18 is transferred to the engine oil and the engine oil is heated (warmed up). After warmed up, the engine oil is sent to each part in the engine 3 through the oil pipe 17.

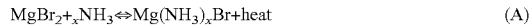

$$MgBr_2 + xNH_3 \Leftrightarrow Mg(NH_3)_xBr + heat \quad (A)$$

Once high-temperature exhaust gas is subsequently supplied to the reactor 12 through the exhaust gas pipe 22, the $NH_3$ is desorbed from the reaction material 18 by the heat of the exhaust gas being given to the reaction material 18. In other words, a reaction (regeneration reaction) from the right side to the left side in the reaction formula (A) above occurs. Once the valve 21 is opened at this time, the pressure difference between the reactor 12 and the adsorber 13 causes the $NH_3$ to return to the adsorber 13 through the $NH_3$ pipe 20 and the $NH_3$ is physically adsorbed by the adsorption material 19 of the adsorber 13. As a result, the $NH_3$ is recovered by the adsorber 13.

The chemical heat storage apparatus 11 is also provided with a temperature sensor 30, a temperature sensor 31, a temperature sensor 32, a pressure sensor 33, and a controller 34. The temperature sensor 30 is a temperature detection unit detecting the temperature of exhaust gas. For example, the temperature sensor 30 detects the temperature of the exhaust gas flowing through the exhaust gas pipe 22, that is, the temperature of the exhaust gas supplied to the reactor 12. The temperature sensor 31 detects the temperature of engine oil. For example, the temperature sensor 31 detects the temperature of the engine oil flowing through the oil pipe 17, that is, the temperature of the engine oil flowing downstream of the reactor 12. The temperature sensor 32 detects the temperature of the adsorber 13. The pressure sensor 33 detects the internal pressure of the adsorber 13.

The controller 34 is configured to include a CPU, a RAM, a ROM, an input-output interface, and so on. The controller 34 has a heat generation control unit 35 and an exhaust gas supply control unit 36.

The heat generation control unit 35 controls the $NH_3$ flow system 14 such that heat is generated by a chemical reaction between $NH_3$ and the reaction material 18 of the reactor 12 and the engine oil is heated when the engine 3 is started. The exhaust gas supply control unit 36 controls the exhaust gas supply system 15 such that $NH_3$ is desorbed from the reaction material 18 by the heat of the exhaust gas and the engine oil is heated when the temperature of the exhaust gas detected by the temperature sensor 30 reaches a predetermined temperature or more.

The exhaust gas supply system 15 and the exhaust gas supply control unit 36 constitute an exhaust gas utilization unit 37 that desorbs $NH_3$ from the reaction material 18 by using the heat of the exhaust gas and heats the engine oil by using the heat of the exhaust gas when the temperature of the exhaust gas discharged from the engine 3 reaches a predetermined temperature or more.

Figure 3:
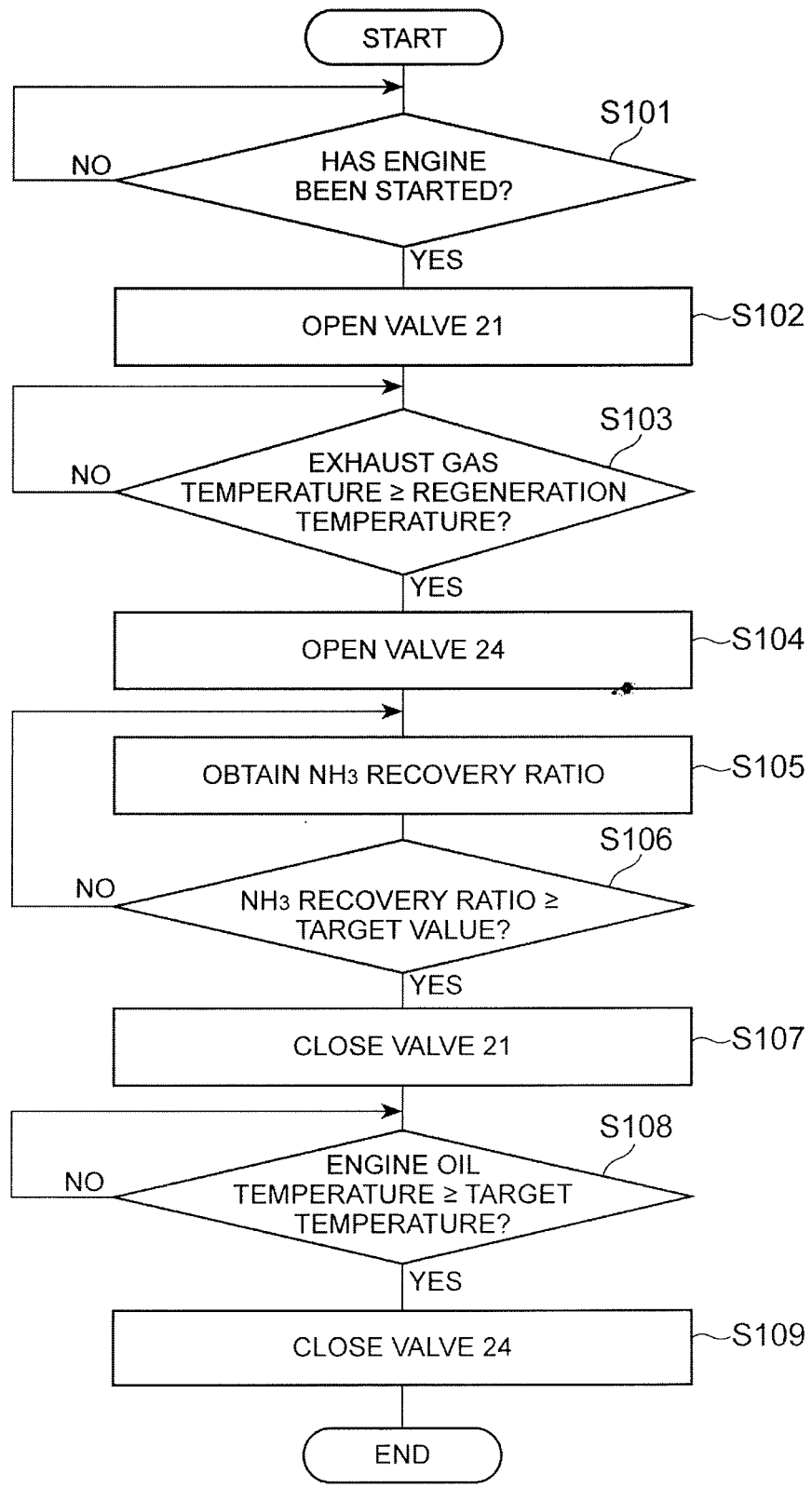
FIG. 3 is a flowchart illustrating details of a control processing procedure executed by a controller illustrated in FIG. 1.

FIG. 3 is a flowchart illustrating details of a control processing procedure executed by the controller 34. In the initial state of this processing, the valves 21 and 24 remain closed. In addition, pressure-holding $NH_3$ for holding a predetermined pressure in the reaction system of the reactor 12, the adsorber 13, and the $NH_3$ pipe 20 when the valve 21 is open and $NH_3$ for transfer used for a chemical reaction with the reaction material 18 so that a desired heat generation temperature is obtained in the reactor 12 remain adsorbed by the adsorption material 19 of the adsorber 13. The amounts of the pressure-holding $NH_3$ and the $NH_3$ for transfer are appropriately determined in view of the material of the reaction material 18 and so on.

In FIG. 3, the controller 34 first determines, based on an operation signal of an ignition switch (IG switch) 38, whether or not the engine 3 has been started (procedure S101). Once the controller 34 determines that the engine 3 has been started, the controller 34 opens the valve 21 by controlling the valve 21 (procedure S102). As a result, the $NH_3$ for transfer is supplied from the adsorber 13 to the reactor 12 and the engine oil is heated by the heat generated by a chemical reaction between the reaction material 18 of the reactor 12 and the $NH_3$ for transfer.

Next, the controller 34 determines, based on the detection value of the temperature sensor 30, whether or not the temperature of the exhaust gas is equal to or higher than a regeneration temperature (predetermined temperature) (procedure S103). The regeneration temperature is a temperature at which so-called regeneration of the reaction material 18 can be performed by the $NH_3$ for transfer being desorbed from the reaction material 18. The regeneration temperature is, for example, 100° C.

Once the controller 34 determines that the temperature of the exhaust gas is equal to or higher than the regeneration temperature, the controller 34 opens the valve 24 by controlling the valve 24 (procedure S104). As a result, the high-temperature exhaust gas flowing through the exhaust passage 7 is supplied to the exhaust gas passage portion 27 of the reactor 12 through the exhaust gas pipe 22, the heat of the high-temperature exhaust gas is transferred from the exhaust gas passage portion 27 to the reaction material-filled portion 25, the $NH_3$ for transfer is desorbed from the reaction material 18 by the heat of the exhaust gas, and the $NH_3$ for transfer is recovered from the reactor 12 to the adsorber 13.

Subsequently, the controller 34 obtains the $NH_3$ recovery ratio of the adsorber 13 based on the detection values of the temperature sensor 32 and the pressure sensor 33 (procedure S105). The $NH_3$ recovery ratio of the adsorber 13 is the ratio of recovery of the $NH_3$ for transfer with respect to the adsorber 13. More specifically, the $NH_3$ recovery ratio of the adsorber 13 is the ratio of the amount of recovery of the $NH_3$ for transfer with respect to the adsorber 13 to the total amount of the $NH_3$ for transfer.

At this time, the controller 34 estimates the amount of the $NH_3$ adsorbed by the adsorption material 19 of the adsorber 13 (NH$_3$ adsorption amount of the adsorber 13) based on the temperature of the adsorber 13 detected by the temperature sensor 32 and the internal pressure of the adsorber 13 detected by the pressure sensor 33.

Figure 4:
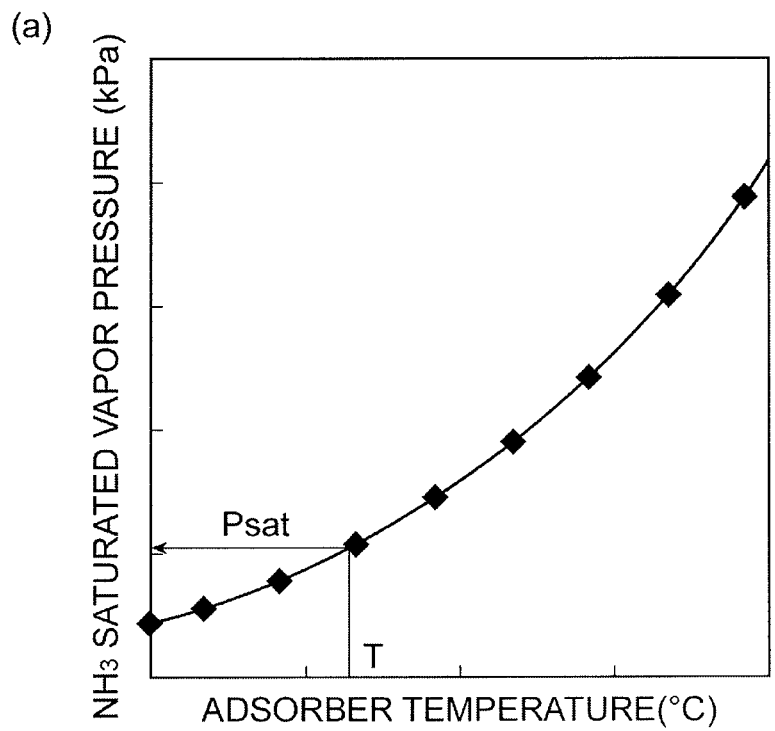
FIG. 4 is a graph showing a $NH_3$ saturated vapor pressure characteristic and a $NH_3$ adsorption characteristic.
Figure 4:
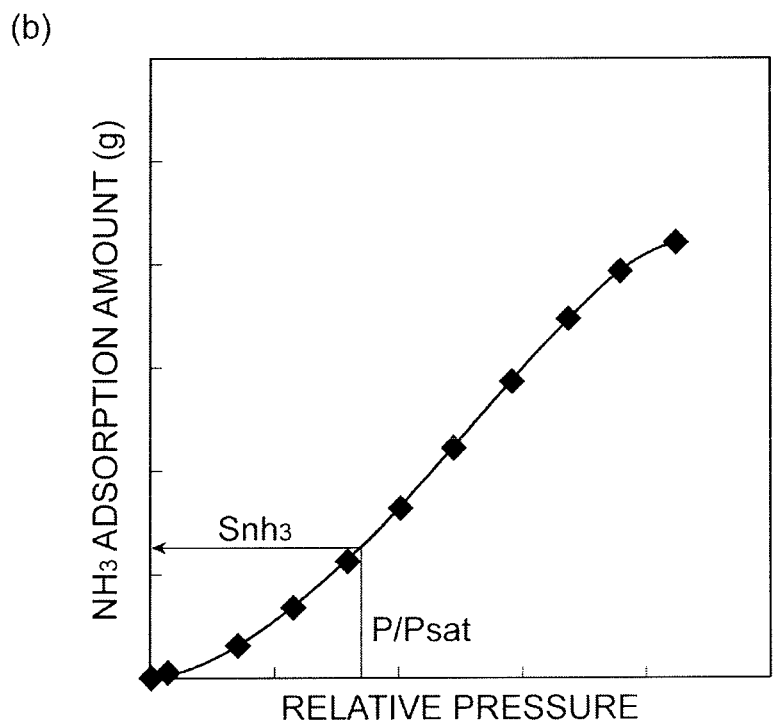

The estimation of the NH$_3$ adsorption amount is performed by means of the NH$_3$ saturated vapor pressure characteristic and the NH$_3$ adsorption characteristic illustrated in FIG. 4. The NH$_3$ saturated vapor pressure characteristic illustrated in FIG. 4(a) is a graph showing the relationship between the temperature of the adsorber 13 and the NH$_3$ saturated vapor pressure, in which the NH$_3$ saturated vapor pressure increases as the temperature of the adsorber 13 increases. The NH$_3$ adsorption characteristic illustrated in FIG. 4(b) is a graph showing the relationship between the relative pressure and the NH$_3$ adsorption amount of the adsorber 13, in which the NH$_3$ adsorption amount of the adsorber 13 increases as the relative pressure increases. The relative pressure is the ratio (P/P$_{sat}$) between a NH$_3$ saturated vapor pressure P$_{sat}$ and an internal pressure P of the adsorber 13.

The controller 34 first obtains, by using the NH$_3$ saturated vapor pressure characteristic, the NH$_3$ saturated vapor pressure P$_{sat}$ corresponding to a temperature T of the adsorber 13 detected by the temperature sensor 32. Then, the controller 34 calculates the relative pressure, which is the ratio between the NH$_3$ saturated vapor pressure P$_{sat}$ and the internal pressure P of the adsorber 13 detected by the pressure sensor 33. Then, the controller 34 obtains, by using the NH$_3$ adsorption characteristic, a NH$_3$ adsorption amount S$_{nh3}$ corresponding to the relative pressure. The NH$_3$ adsorption amount of the adsorber 13 is estimated in this manner.

Then, the controller 34 obtains the NH$_3$ recovery ratio of the adsorber 13 from the NH$_3$ adsorption amount of the adsorber 13. For example, the NH$_3$ recovery ratio of the adsorber 13 is 0% when the NH$_3$ adsorption amount of the adsorber 13 is an amount corresponding to the pressure-holding NH$_3$ and the NH$_3$ recovery ratio of the adsorber 13 is 100% when the NH$_3$ adsorption amount of the adsorber 13 is the total value of an amount corresponding to the pressure-holding NH$_3$ and an amount corresponding to the total amount of the NH$_3$ for transfer.

Next, the controller 34 determines whether or not the NH$_3$ recovery ratio of the adsorber 13 is equal to or greater than a target value (such as 90%) (procedure S106). Once the controller 34 determines that the NH$_3$ recovery ratio of the adsorber 13 is less than the target value, the controller 34 executes procedure S105 again. Once the controller 34 determines that the NH$_3$ recovery ratio of the adsorber 13 is equal to or greater than the target value, the controller 34 closes the valve 21 by controlling the valve 21 (procedure S107). As a result, recovery of the NH$_3$ for transfer from the reactor 12 to the adsorber 13 is terminated.

Next, the controller 34 determines, based on the detection value of the temperature sensor 31, whether or not the temperature of the engine oil is equal to or higher than a target temperature (such as 100° C.) (procedure S108). When the temperature of the engine oil is lower than the target temperature, the valve 24 is maintained in an open state. As a result, exhaust gas supply from the exhaust passage 7 to the reactor 12 continues, and thus the heat of the high-temperature exhaust gas is transferred from the exhaust gas passage portion 27 to the oil passage portion 26 and the engine oil is heated by the heat of the exhaust gas.

Once the controller 34 determines that the temperature of the engine oil is equal to or higher than the target temperature, the controller 34 closes the valve 24 by controlling the valve 24 (procedure S109) and terminates this processing. As a result, exhaust gas supply from the exhaust passage 7 to the reactor 12 is stopped, and thus heating of the engine oil by the heat of the exhaust gas is terminated.

In the above, the heat generation control unit 35 executes procedures S101 and S102 and the exhaust gas supply control unit 36 executes procedures S103, S104, S108, and S109.

As described above, in the present embodiment, so-called regeneration of the reaction material 18, during which NH$_3$ is desorbed from the reaction material 18 of the reactor 12 by means of the heat of high-temperature exhaust gas, is performed when the temperature of the exhaust gas is equal to or higher than the regeneration temperature. Accordingly, regeneration of the reaction material 18 can be sufficiently performed. As a result, a desired amount of NH$_3$ is supplied from the adsorber 13 to the reactor 12 during the next heat generation reaction, and thus sufficient heat can be generated by a chemical reaction between NH$_3$ and the reaction material 18. In addition, the engine oil is heated with the heat generated from a chemical reaction between NH$_3$ and the reaction material 18 when the engine 3 has been started and the engine oil is heated with the heat of high-temperature exhaust gas when the temperature of the exhaust gas is equal to or higher than the regeneration temperature. Accordingly, the engine oil can be sufficiently heated.

In a case where the engine oil is heated only by the heat generated from a chemical reaction between NH$_3$ and the reaction material 18, a certain amount of heat needs to be generated from the reactor 12 for a desired fuel economy effect to be obtained. In this case, the amount by which the reactor 12 is filled with the reaction material 18 and the amount by which the adsorber 13 is filled with the adsorption material 19 should be increased. This results in an increase in the size of the reactor 12 and an increase in the size of the adsorber 13 and, in turn, an increase in the size of the chemical heat storage apparatus 11. In the present embodiment, in contrast, the engine oil is heated with the heat of high-temperature exhaust gas when the temperature of the exhaust gas is equal to or higher than the regeneration temperature, and thus the amount by which the reactor 12 is filled with the reaction material 18 and the amount by which the adsorber 13 is filled with the adsorption material 19 can be reduced and the reactor 12 and the adsorber 13 can be reduced in size.

In addition, in the present embodiment, NH$_3$ is desorbed from the reaction material 18 and the engine oil is heated by the heat of exhaust gas when the temperature of the exhaust gas is equal to or higher than the regeneration temperature. Regeneration of the reaction material 18 and heating of the engine oil are performed by exhaust gas being directly used as described above, and thus the configuration of the exhaust gas utilization unit 37 can be simplified.

Furthermore, in the present embodiment, the exhaust gas passage portion 27 is disposed adjacent to the reaction material-filled portion 25 and the oil passage portion 26, and thus regeneration of the reaction material 18 and heating of the engine oil by the heat of exhaust gas can be efficiently performed.

In the present embodiment, exhaust gas is supplied to the reactor 12 from the downstream side of the DPF 5 on the exhaust passage 7 and the exhaust gas is returned from the reactor 12 to the upstream side of the DOC 4 on the exhaust passage 7. However, the present invention is not particularly limited thereto. For example, exhaust gas may be supplied to the reactor 12 from the downstream side of a muffler on the exhaust passage 7 and the exhaust gas may be returned from the reactor 12 to any place on the exhaust passage 7 instead.

Alternatively, because the exhaust gas flowing through the downstream side of the muffler on the exhaust passage 7 is already purified, the purified exhaust gas may be released to the outside without being returned to the exhaust passage 7.

In the present embodiment, the reactor 12 has a structure in which the reaction material-filled portions 25, the oil passage portions 26, and the exhaust gas passage portions 27 are alternately stacked. However, the configuration of the reactor 12 is not particularly limited to a stacking structure as described above, and the oil passage portion 26 may be disposed adjacent to the reaction material-filled portion 25 and the exhaust gas passage portion 27 may be disposed adjacent to the reaction material-filled portion 25 and the oil passage portion 26.

Figure 5:
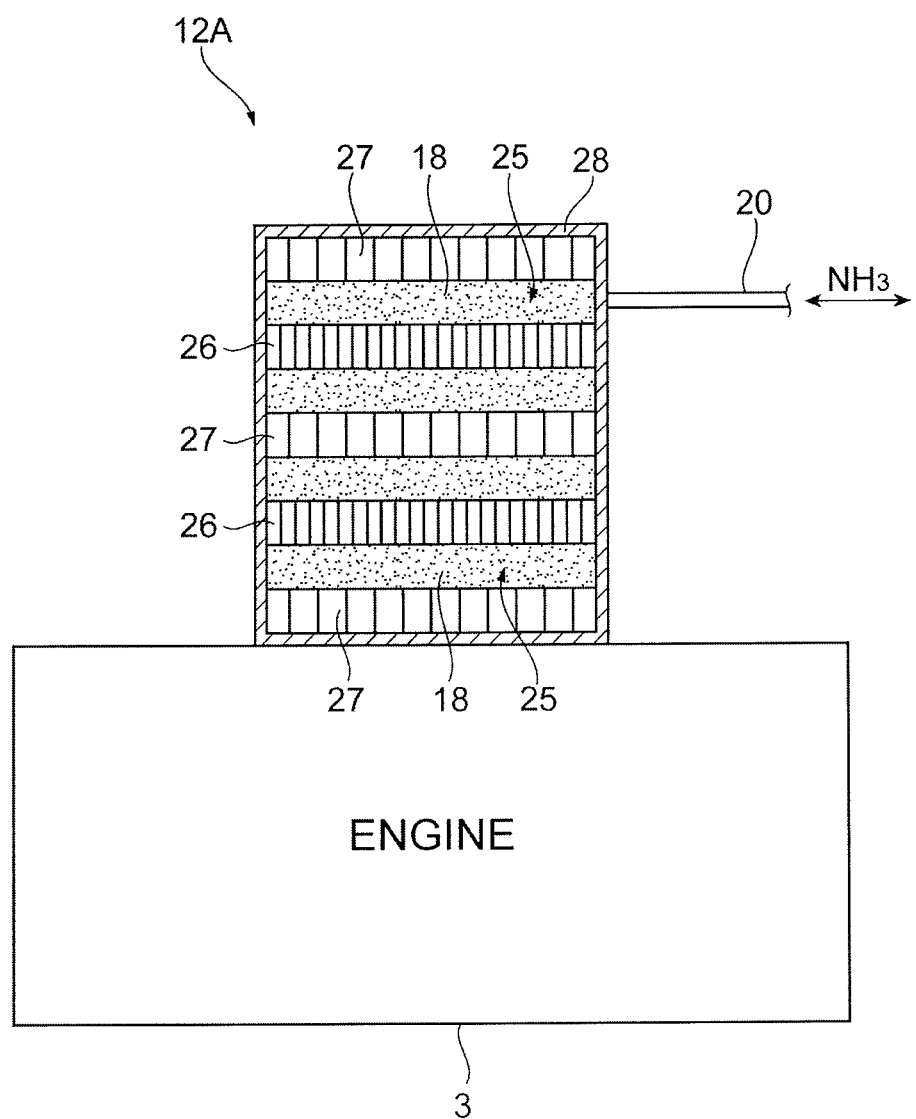
FIG. 5 is a longitudinal sectional view illustrating a modification example of the reactor illustrated in FIG. 2.

FIG. 5 is a longitudinal sectional view illustrating a modification example of the reactor 12 illustrated in FIG. 2. In FIG. 5, a reactor 12A according to this modification example has the plurality of reaction material-filled portions 25, the plurality of oil passage portions 26, the plurality of exhaust gas passage portions 27, and the housing 28 as is the case with the reactor 12 described above.

The oil passage portions 26 and the exhaust gas passage portions 27 are alternately stacked via the reaction material-filled portions 25.

The oil passage portion 26 is disposed adjacent to the reaction material-filled portion 25. The exhaust gas passage portion 27 is disposed adjacent to the reaction material-filled portion 25 on the side opposite to the oil passage portion 26 across the reaction material-filled portion 25. In other words, the oil passage portion 26 and the exhaust gas passage portion 27 are disposed across the reaction material-filled portion 25 and are not adjacent to each other. The exhaust gas passage portions 27 are disposed in the upper end portion and the lower end portion of the reactor 12A.

In the reactor 12A, the direction in which the engine oil flows through the oil passage portion 26 and the direction in which the exhaust gas flows through the exhaust gas passage portion 27 are parallel to each other. At this time, the engine oil and the exhaust gas may flow in the same direction or in opposite directions. The direction in which the engine oil flows and the direction in which the exhaust gas flows may be orthogonal to each other instead.

In this modification example, the exhaust gas passage portion 27 is disposed on the side opposite to the oil passage portion 26 across the reaction material-filled portion 25, and thus an excessive rise in engine oil temperature attributable to the heat of exhaust gas is suppressed. As a result, engine oil deterioration attributable to a high engine oil temperature can be suppressed.

In this modification example, the reactor 12A has the plurality of reaction material-filled portions 25, the plurality of oil passage portions 26, and the plurality of exhaust gas passage portions 27. However, the numbers of the reaction material-filled portions 25, the oil passage portions 26, and the exhaust gas passage portions 27 are not particularly limited thereto, and the reactor 12A may have one reaction material-filled portion 25, one oil passage portion 26, and one exhaust gas passage portion 27 instead.

Figure 6:
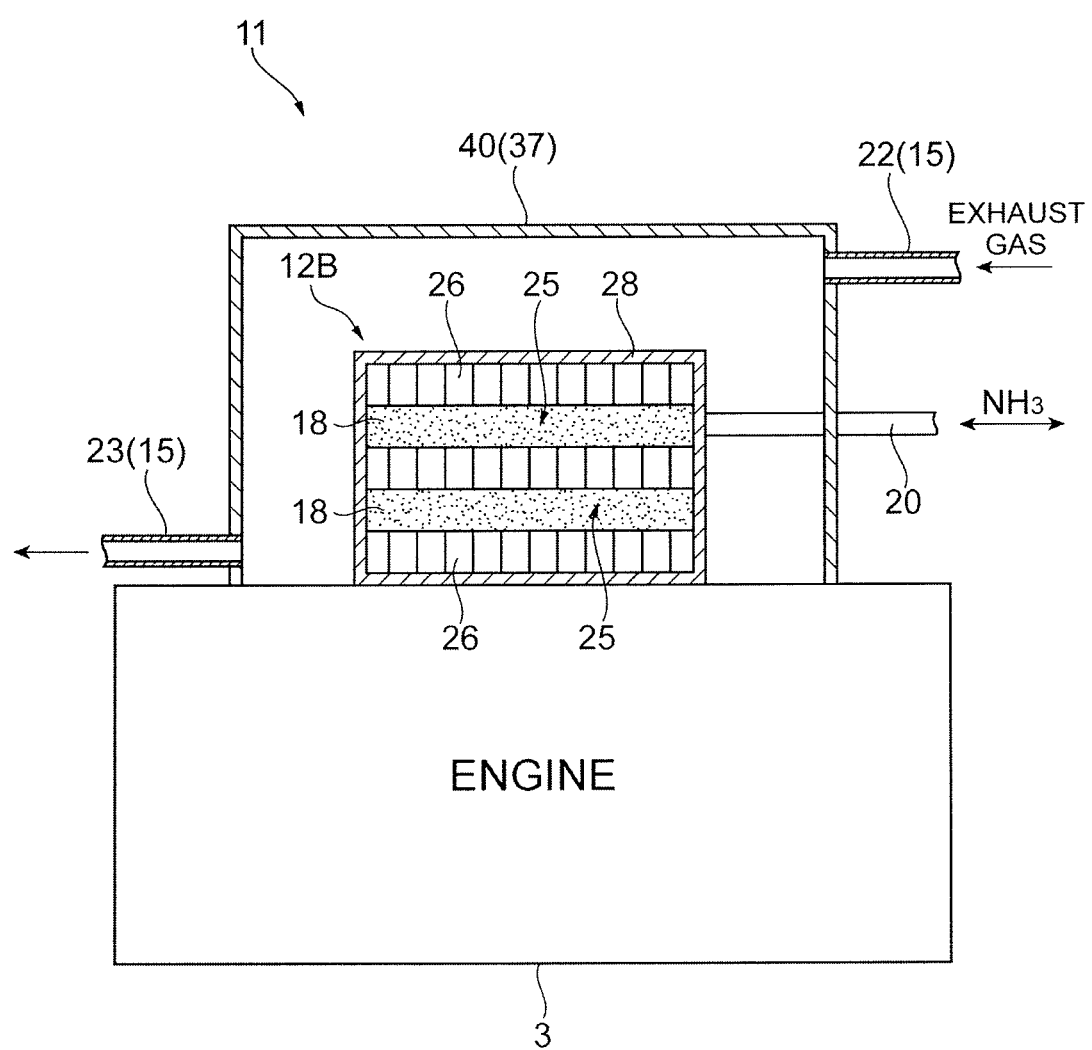
FIG. 6 is a longitudinal sectional view illustrating a cover and a reactor of a chemical heat storage apparatus according to a second embodiment of the present invention.
Figure 7:
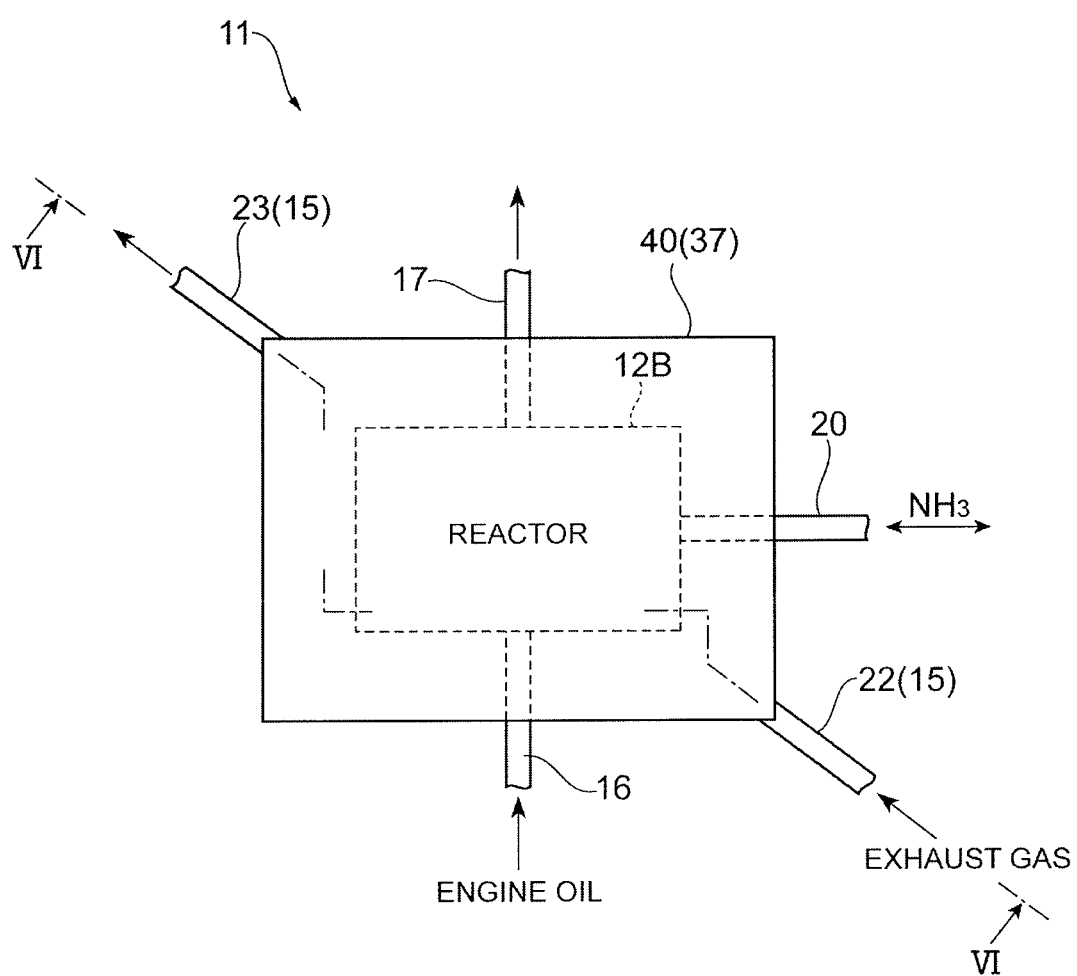
FIG. 7 is a plan view illustrating the cover and the reactor illustrated in FIG. 6.

FIG. 6 is a longitudinal sectional view illustrating a cover and a reactor of a chemical heat storage apparatus according to a second embodiment of the present invention. FIG. 7 is a plan view illustrating the cover and the reactor illustrated in FIG. 6. FIG. 6 is a sectional view taken along line VI-VI of FIG. 7.

In FIGS. 6 and 7, the chemical heat storage apparatus 11 according to the present embodiment is provided with a reactor 12B and a cover 40 covering the reactor 12B. The reactor 12B has the plurality of reaction material-filled portions 25, the plurality of oil passage portions 26, and the housing 28 described above. The reaction material-filled portions 25 and the oil passage portions 26 are alternately stacked. Accordingly, the oil passage portion 26 is disposed adjacent to the reaction material-filled portion 25.

The cover 40 is attached to the outer wall surface of the engine 3 to cover the reactor 12. The cover 40 has a quadrangular plan-view shape. The cover 40 is formed of the same material as the housing 28. The cover 40 constitutes a part of the exhaust gas utilization unit 37 with the exhaust gas supply system 15. The shape of the cover 40 is not particularly limited to a quadrangular plan-view shape and may be, for example, hemispherical instead.

The exhaust gas supply system 15 supplies exhaust gas from the exhaust passage 7 into the cover 40. The exhaust gas supply system 15 has the exhaust gas pipes 22 and 23 described above. The exhaust gas pipes 22 and 23 are connected to two corners of the cover 40 to be positioned on the diagonals of the cover 40 in a plan view. In addition, the exhaust gas pipe 22 is connected to a tip portion of the cover 40 and the exhaust gas pipe 23 is connected to the base end portion of the cover 40. As a result, exhaust gas is likely to flow throughout the inside of the cover 40. Places where the exhaust gas pipes 22 and 23 are connected to the cover 40 are not particularly limited to the above.

The $NH_3$ pipe 20 is connected to the housing 28 through the cover 40. The oil pipes 16 and 17 are connected to each oil passage portion 26 through the cover 40.

In the chemical heat storage apparatus 11 as described above, exhaust gas is introduced into the cover 40 through the exhaust gas pipe 22 to hit the outer wall surface of the reactor 12B and is guided out through the exhaust gas pipe 23 from the inside of the cover 40. As a result, the reactor 12B itself is warmed by the heat of the exhaust gas. At this time, the heat of the exhaust gas is transferred to the reaction material-filled portion 25 through the housing 28 and $NH_3$ for transfer is desorbed from the reaction material 18. In addition, the heat of the exhaust gas is transferred to the oil passage portion 26 through the housing 28 and engine oil is heated.

In the present embodiment, the reactor 12B is covered with the cover 40 and the reactor 12B itself is warmed by exhaust gas being supplied into the cover 40, and thus the reactor 12B does not have to be provided with an exhaust gas passage portion through which exhaust gas passes. Accordingly, the structure of the reactor 12B can be simplified.

In the present embodiment, the reactor 12B has a structure in which the reaction material-filled portions 25 and the oil passage portions 26 are alternately stacked. However, the configuration of the reactor 12B is not particularly limited to a stacking structure as described above, and the oil passage portion 26 may be disposed adjacent to the reaction material-filled portion 25.

Figure 8:
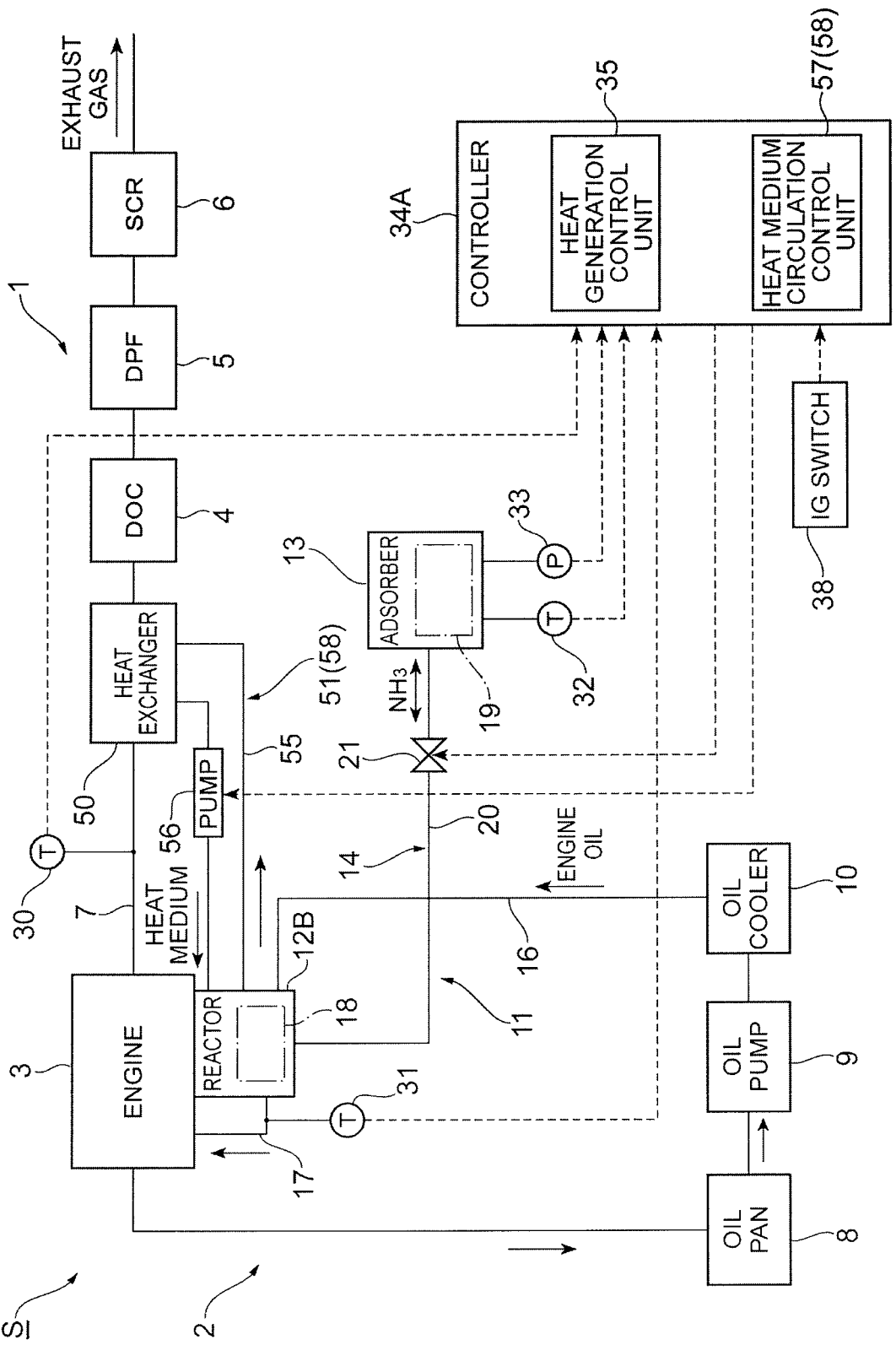
FIG. 8 is a schematic configuration diagram illustrating an exhaust purification system and an engine oil circulation system that is provided with a chemical heat storage apparatus according to a third embodiment of the present invention.

FIG. 8 is a schematic configuration diagram illustrating an exhaust purification system and an engine oil circulation system that is provided with a chemical heat storage apparatus according to a third embodiment of the present invention.

In FIG. 8, the chemical heat storage apparatus 11 according to the present embodiment is provided with the reactor 12B similar to that according to the second embodiment described above, a heat exchanger 50 arranged between the engine 3 and the DOC 4 on the exhaust passage 7 and performing heat exchange between exhaust gas and a heat medium, and a heat medium circulation system 51 circulating the heat medium between the heat exchanger 50 and the reactor 12B.

Organic heat transfer oil, phenyl ether synthetic oil, or the like is used as the heat medium. Examples of the organic heat transfer oil include Barrel Silicone Fluid ST and Barrel Therm Series manufactured by MATSUMURA OIL Co., Ltd.

Figure 9:
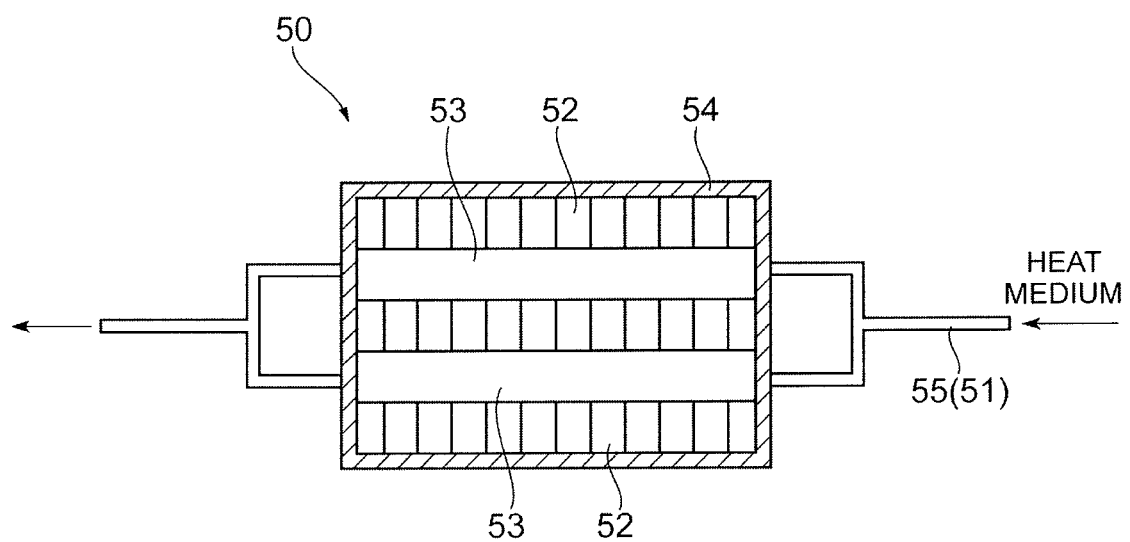
FIG. 9 is a longitudinal sectional view of a heat exchanger illustrated in FIG. 8.

The heat exchanger 50 has a rectangular parallelepiped shape. As illustrated in FIG. 9, the heat exchanger 50 has a plurality of exhaust gas passage portions 52 through which exhaust gas passes, a plurality of heat medium passage portions 53 through which the heat medium passes, and a housing 54 accommodating the exhaust gas passage portions 52 and the heat medium passage portions 53. The exhaust gas passage portions 52 and the heat medium passage portions 53 are alternately stacked. Accordingly, the heat medium passage portion 53 is disposed adjacent to the exhaust gas passage portion 52. When high-temperature exhaust gas flows through the exhaust gas passage portion 52, the heat medium flowing through the heat medium passage portion 53 is heated through heat exchange by the heat of the high-temperature exhaust gas. The shape of the heat exchanger 50 is not particularly limited to a rectangular parallelepiped shape and may be cylindrical instead.

The heat medium circulation system 51 has a heat medium pipe 55 interconnecting the heat exchanger 50 and the reactor 12B. The heat medium flows through the heat medium pipe 55. The heat medium circulation system 51 also has a circulation pump 56 arranged on the heat medium pipe 55 and circulating and supplying to the reactor 12B the high-temperature heat medium resulting from heat exchange by the heat exchanger 50.

As illustrated in FIG. 9, the heat medium pipe 55 is connected to each heat medium passage portion 53 of the heat exchanger 50. Specifically, both end portions of the heat medium pipe 55 are respectively connected to the heat medium passage portions 53 in a branching form such that the heat exchanger 50 is interposed. In the heat exchanger 50, the direction in which exhaust gas flows through the exhaust gas passage portion 52 and the direction in which the heat medium flows through the heat medium passage portion 53 are orthogonal to each other. The direction in which the exhaust gas flows and the direction in which the heat medium flows may be parallel to each other instead. In this case, the exhaust gas and the heat medium may flow in the same direction or in opposite directions.

Figure 10:
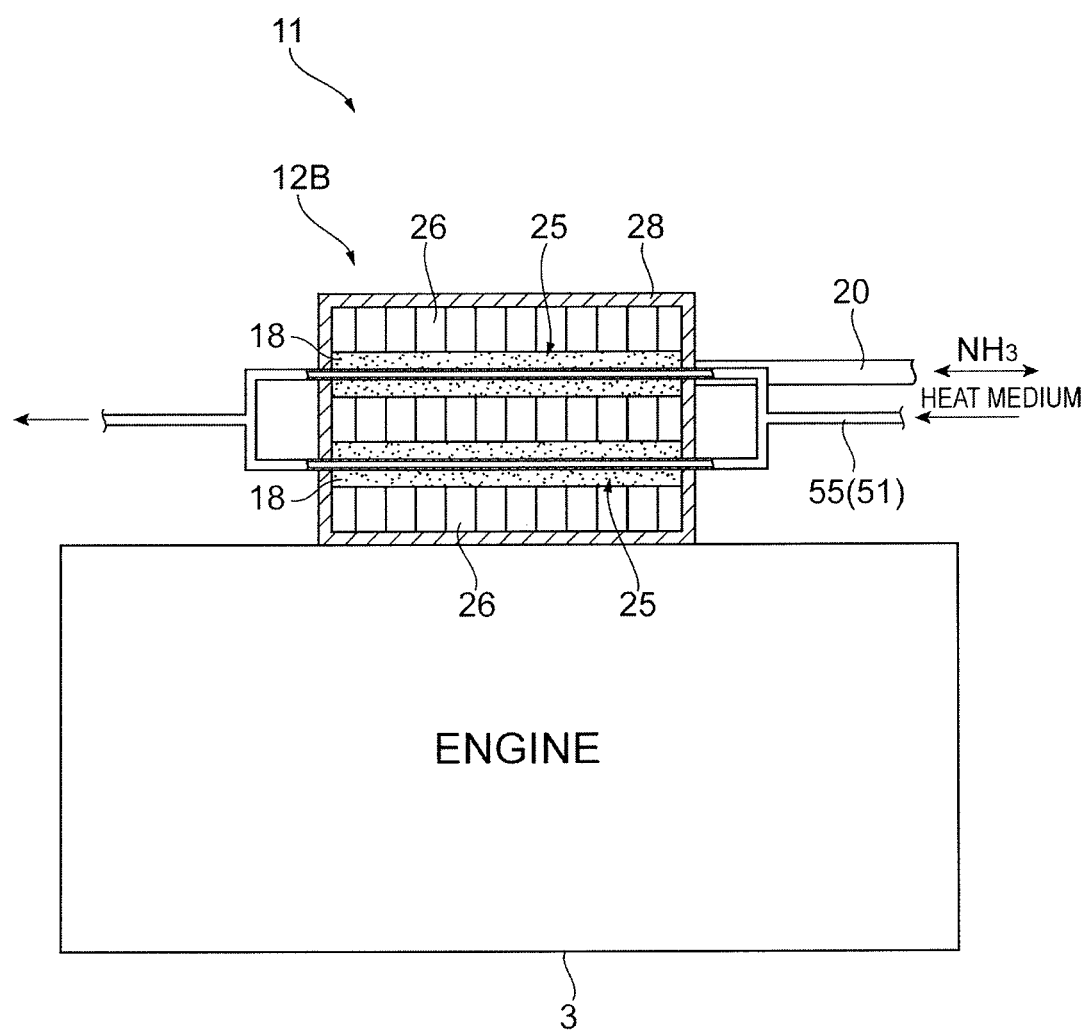
FIG. 10 is a longitudinal sectional view of a reactor illustrated in FIG. 8.

As illustrated in FIG. 10, a part of the heat medium pipe 55 passes through each reaction material-filled portion 25 of the reactor 12B in a branching form. In the reactor 12B, the direction in which the engine oil flows through the oil passage portion 26 and the direction in which the heat medium flows through the reaction material-filled portion 25 are orthogonal to each other. The direction in which the engine oil flows and the direction in which the heat medium flows may be parallel to each other instead. In this case, the engine oil and the heat medium may flow in the same direction or in opposite directions.

The chemical heat storage apparatus 11 is also provided with the temperature sensor 30 and a controller 34A. The temperature sensor 30 detects, for example, the temperature of the exhaust gas flowing between the engine 3 and the heat exchanger 50 on the exhaust passage 7. The controller 34A has the heat generation control unit 35 described above and a heat medium circulation control unit 57.

The heat medium circulation control unit 57 controls the heat medium circulation system 51 such that $NH_3$ is desorbed from the reaction material 18 by the heat of the heat medium and the engine oil is heated when the temperature of the exhaust gas detected by the temperature sensor 30 reaches a predetermined temperature or more.

The heat medium circulation system 51 and the heat medium circulation control unit 57 constitute an exhaust gas utilization unit 58 that desorbs $NH_3$ from the reaction material 18 by using the heat of the exhaust gas and heats the engine oil by using the heat of the exhaust gas when the temperature of the exhaust gas reaches a predetermined temperature or more.

Figure 11:
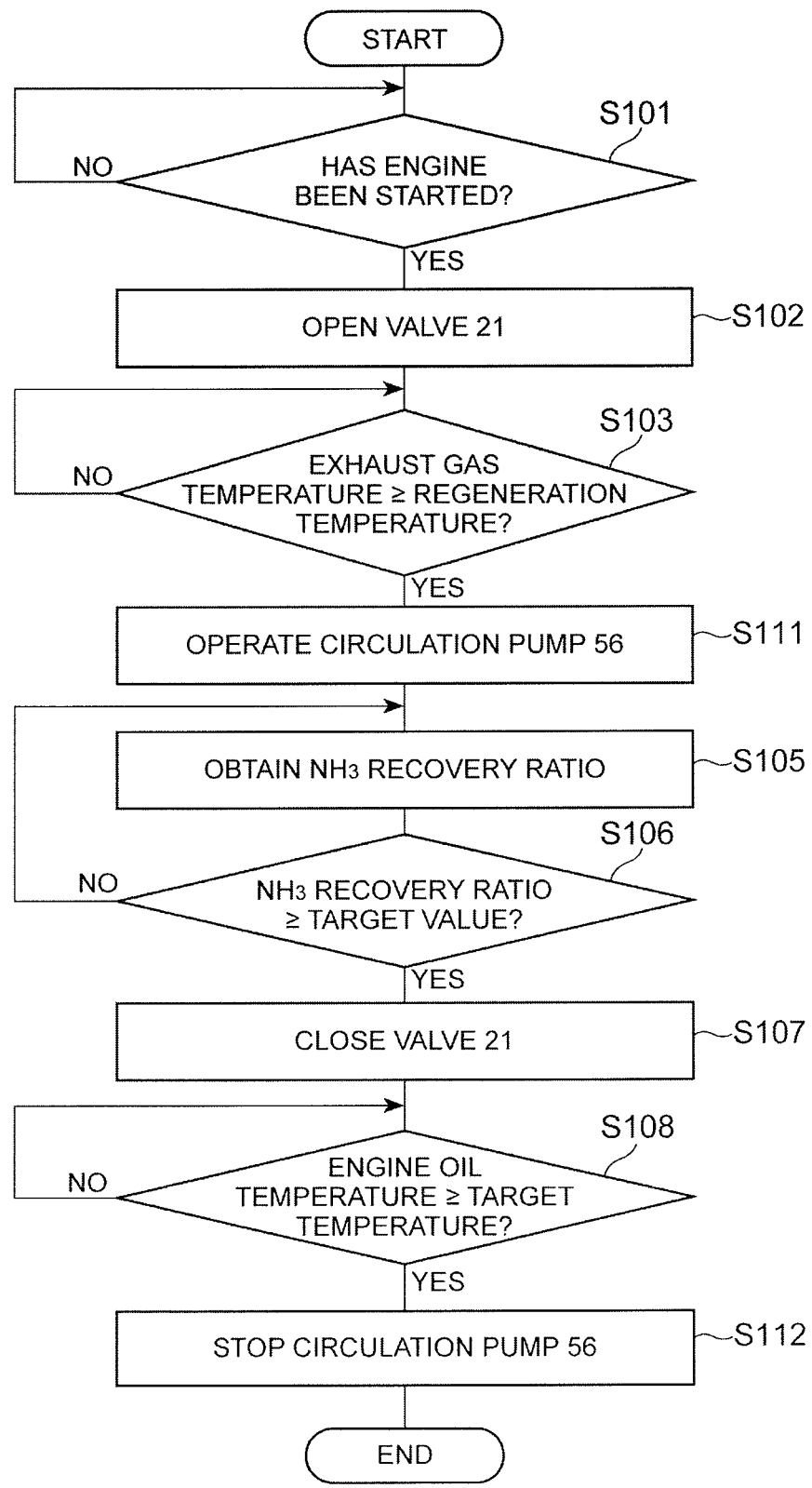
FIG. 11 is a flowchart illustrating details of a control processing procedure executed by a controller illustrated in FIG. 8.

FIG. 11 is a flowchart illustrating details of a control processing procedure executed by the controller 34A. In FIG. 11, the controller 34A executes procedures S101 to S103 as in the processing illustrated in FIG. 3.

Subsequently, once the controller 34A determines that the temperature of the exhaust gas is equal to or higher than the regeneration temperature, the controller 34A operates the circulation pump 56 by controlling the circulation pump 56 (procedure S111). As a result, the high-temperature heat medium resulting from heat exchange by the heat exchanger 50 is supplied to the reaction material-filled portion 25 of the reactor 12B through the heat medium pipe 55, $NH_3$ for transfer is desorbed from the reaction material 18 by the heat of the high-temperature heat medium being given to the reaction material 18, and the $NH_3$ for transfer is recovered from the reactor 12B to the adsorber 13.

Subsequently, the controller 34A executes procedures S105 to S108 as in the processing illustrated in FIG. 3. When the temperature of the engine oil is lower than a target temperature, the circulation pump 56 remains in operation. As a result, supply of the high-temperature heat medium to the reactor 12B continues, and thus the heat of the high-temperature heat medium is transferred from the reaction material-filled portion 25 to the oil passage portion 26 and the engine oil is heated by the heat of the heat medium.

Once the controller 34A determines that the temperature of the engine oil is equal to or higher than the target temperature, the controller 34A stops the circulation pump 56 by controlling the circulation pump 56 (procedure S112) and terminates this processing. As a result, heat medium supply to the reactor 12B is stopped, and thus heating of the engine oil by the heat of the heat medium is terminated.

In the above, the heat medium circulation control unit 57 executes procedures S103, S111, S108, and S112.

As described above, also in the present embodiment, so-called regeneration of the reaction material 18, during which $NH_3$ is desorbed from the reaction material 18 of the reactor 12B by means of the heat of high-temperature exhaust gas, is performed when the temperature of the exhaust gas reaches a predetermined temperature or more.

Accordingly, regeneration of the reaction material 18 can be sufficiently performed. In addition, the engine oil is heated with the heat generated from a chemical reaction between $NH_3$ and the reaction material 18 when the engine 3 has been started and the engine oil is heated with the heat of high-temperature exhaust gas when the temperature of the exhaust gas reaches a predetermined temperature or more. Accordingly, the engine oil can be sufficiently heated.

In addition, in the present embodiment, $NH_3$ is desorbed from the reaction material 18 and the engine oil is heated by the heat of the high-temperature heat medium resulting from heat exchange with the exhaust gas by the heat exchanger 50 when the temperature of the exhaust gas reaches a predetermined temperature or more.

Regeneration of the reaction material 18 and heating of the engine oil can be performed by the use of the heat medium containing no hazardous substance as described above. In addition, the heat exchanger 50 is arranged between the engine 3 and the DOC 4 on the exhaust passage 7, and thus the position where the heat exchanger 50 is disposed is close to the reactor 12B. Accordingly, the heat medium pipe 55 of the heat medium circulation system 51 can be shortened.

Furthermore, in the present embodiment, a part of the heat medium pipe 55 passes through the reaction material-filled portion 25 of the reactor 12B, and thus regeneration of the reaction material 18 by the heat medium can be efficiently performed.

In the present embodiment, the heat exchanger 50 is arranged between the engine 3 and the DOC 4 on the exhaust passage 7. However, the place where the heat exchanger 50 is arranged is not particularly limited thereto. For example, the heat exchanger 50 may be arranged on the downstream side of the DOC 4 on the exhaust passage 7 instead.

Figure 12:
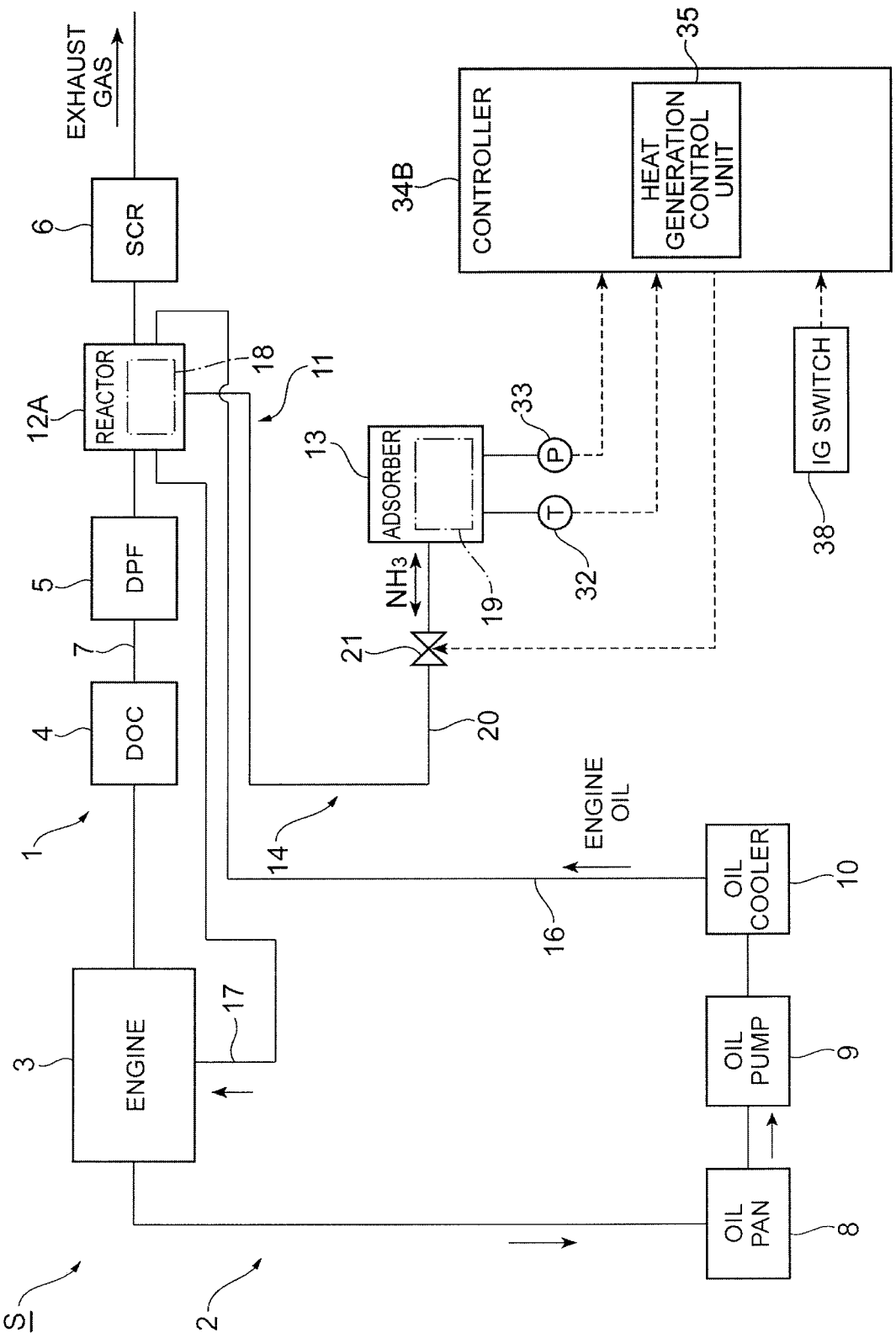
FIG. 12 is a schematic configuration diagram illustrating an exhaust purification system and an engine oil circulation system that is provided with a chemical heat storage apparatus according to a fourth embodiment of the present invention.

FIG. 12 is a schematic configuration diagram illustrating an exhaust purification system and an engine oil circulation system that is provided with a chemical heat storage apparatus according to a fourth embodiment of the present invention.

In FIG. 12, the chemical heat storage apparatus 11 according to the present embodiment is provided with the reactor 12A similar to that according to the modification example described above. The reactor 12A is arranged between the DPF 5 and the SCR 6 on the exhaust passage 7. The exhaust gas passage portion 27 of the reactor 12A communicates with the exhaust passage 7. Accordingly, in a state where exhaust gas is already discharged from the engine 3, the exhaust gas flows to the exhaust gas passage portion 27 at all times. The chemical heat storage apparatus 11 is not provided with the exhaust gas supply system 15 according to the first embodiment.

The chemical heat storage apparatus 11 is also provided with a controller 34B. The controller 34B has the heat generation control unit 35 described above. The chemical heat storage apparatus 11 is not provided with the temperature sensors 30 and 31 according to the first embodiment.

Figure 13:
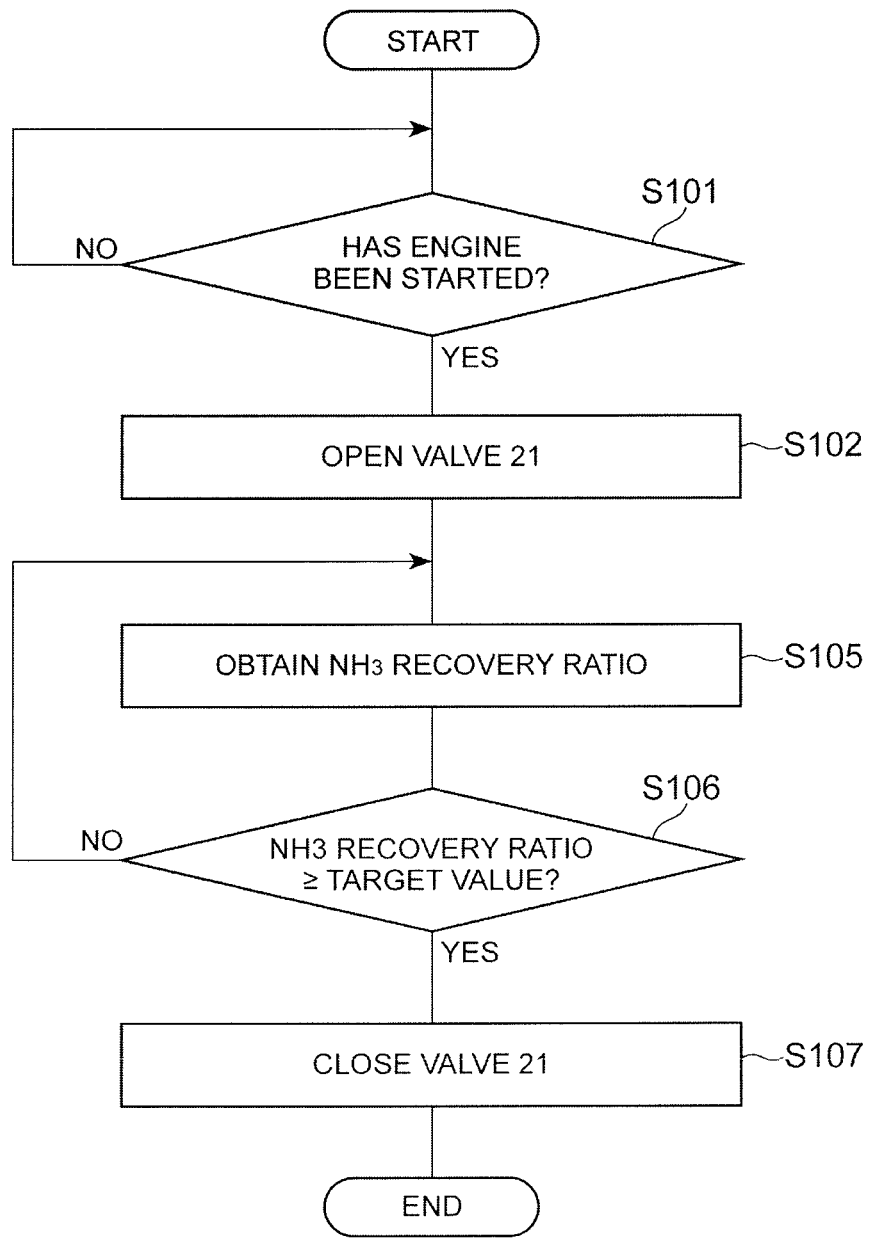
FIG. 13 is a flowchart illustrating details of a control processing procedure executed by a controller illustrated in FIG. 12.

FIG. 13 is a flowchart illustrating details of a control processing procedure executed by the controller 34B. In FIG. 13, the heat generation control unit 35 of the controller 34B executes procedures S101 and S102 as in the processing illustrated in FIG. 3. As a result, $NH_3$ for transfer is supplied from the adsorber 13 to the reactor 12 and the engine oil is heated by the heat generated by a chemical reaction between the reaction material 18 of the reactor 12 and the $NH_3$ for transfer.

Subsequently, once the temperature of the exhaust gas reaches the regeneration temperature, the $NH_3$ for transfer is desorbed from the reaction material 18 by the heat of the exhaust gas flowing through the exhaust gas passage portion 27 of the reactor 12A being given to the reaction material 18 of the reaction material-filled portion 25, and the $NH_3$ for transfer is recovered from the reactor 12A to the adsorber 13. In addition, the engine oil is heated by the heat of the exhaust gas flowing through the exhaust gas passage portion 27.

Subsequently, the controller 34B executes procedures S105 to S107 as in the processing illustrated in FIG. 3. As a result, recovery of the $NH_3$ for transfer from the reactor 12A to the adsorber 13 is terminated.

Figure 14:
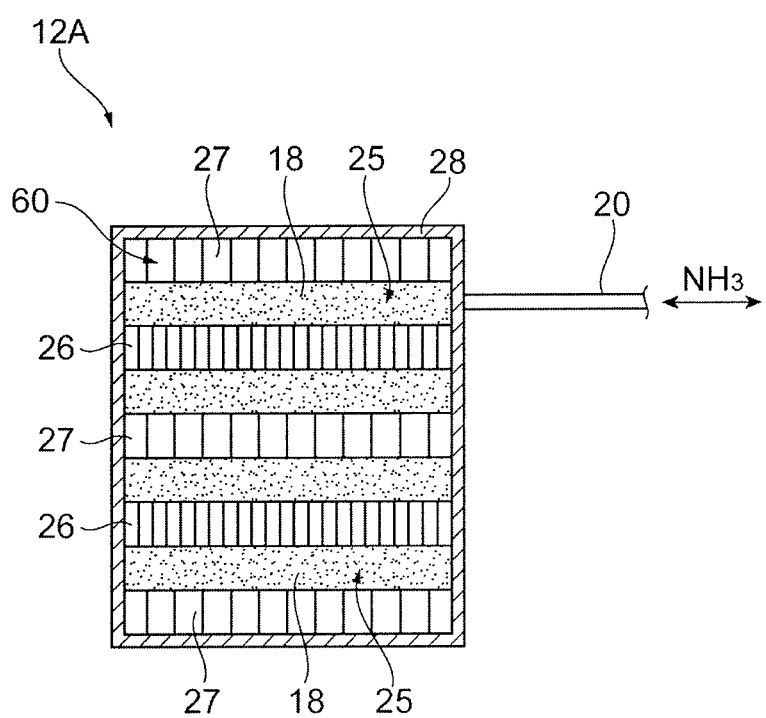
FIG. 14 is a longitudinal sectional view of a reactor illustrated in FIG. 12.

Accordingly, each exhaust gas passage portion 27 of the reactor 12A constitutes, as illustrated in FIG. 14, an exhaust gas utilization unit 60 that desorbs $NH_3$ from the reaction material 18 by using the heat of the exhaust gas and heats the engine oil by using the heat of the exhaust gas when the temperature of the exhaust gas reaches a predetermined temperature or more.

As described above, also in the present embodiment, so-called regeneration of the reaction material 18, during which $NH_3$ is desorbed from the reaction material 18 of the reactor 12A by means of the heat of high-temperature exhaust gas, is performed when the temperature of the exhaust gas reaches a predetermined temperature or more. Accordingly, regeneration of the reaction material 18 can be sufficiently performed. In addition, the engine oil is heated with the heat generated from a chemical reaction between $NH_3$ and the reaction material 18 when the engine 3 has been started and the engine oil is heated with the heat of high-temperature exhaust gas when the temperature of the exhaust gas reaches a predetermined temperature or more. Accordingly, the engine oil can be sufficiently heated.

In addition, in the present embodiment, the reactor 12A is arranged on the exhaust passage 7 and has the exhaust gas passage portion 27 through which exhaust gas passes. Accordingly, regeneration of the reaction material 18 and heating of the engine oil are performed by the exhaust gas flowing through the exhaust passage 7 being directly used, and thus the temperature of the engine oil can be effectively raised. In addition, the exhaust gas supply system 15 including the valve 24 is unnecessary, and thus the configuration of the exhaust gas utilization unit 60 can be sufficiently simplified.

Furthermore, since the valve 24 is unnecessary, exhaust gas supply control does not have to be performed, and thus the control processing of the controller 34B can be simplified.

In addition, in the present embodiment, the exhaust gas passage portion 27 is disposed on the side opposite to the oil passage portion 26 across the reaction material-filled portion 25, and thus an excessive rise in engine oil temperature attributable to the heat of exhaust gas is suppressed. As a result, engine oil deterioration attributable to a high engine oil temperature can be suppressed.

In the present embodiment, the reactor 12A is arranged between the DPF 5 and the SCR 6 on the exhaust passage 7. However, the place where the reactor 12A is arranged is not particularly limited thereto. For example, the reactor 12A may be arranged between the engine 3 and the DOC 4 on the exhaust passage 7 or on the downstream side of the SCR 6 on the exhaust passage 7.

The present invention is not limited to the above-described embodiments of the present invention. For example, the reaction medium is not particularly limited to $NH_3$ and may also be $CO_2$, $H_2O$, and so on although heat is generated through a chemical reaction between $NH_3$ as a reaction medium and the reaction material 18 represented by the composition formula MXa in the embodiments described above. In a case where CO, is used as the reaction medium, MgO, CaO, BaO, $Ca(OH)_2$, $Mg(OH)_2$, $Fe(OH)_2$, $Fe(OH)_3$, FeO, $Fe_2O_3$, $Fe_3O_4$, or the like is used as the reaction material 18 chemically reacting with $CO_2$. In a case where $H_2O$ is used as the reaction medium, CaO, MnO, CuO, $Al_2O_3$, or the like is used as the reaction material 18 chemically reacting with $H_2O$.

In the first to third embodiments described above, a reactor is disposed between the oil cooler 10 and the engine 3. However, the present invention is not particularly limited thereto. For example, a reactor may be disposed between the oil pan 8 and the oil pump 9 or between the oil pump 9 and the oil cooler 10.

In the first to third embodiments described above, a path bypassing the reactor may be disposed on the engine oil circulation path in which the engine oil circulates and exhaust gas alone may be allowed to flow to the reactor, without a bypass engine oil flow to the reactor, during regeneration of the reaction material 18. In this case, engine oil depriving exhaust gas of heat is suppressed, and thus regeneration of the reaction material 18 can be performed early.

Furthermore, although the chemical heat storage apparatus 11 according to the embodiments described above heats engine oil, the heating object is not particularly limited to engine oil and may also be, for example, water or air.

Although the chemical heat storage apparatus 11 according to the embodiments described above is mounted in the vehicle S, the present invention is applicable to any other internal combustion engine-mounted mobile machine, such as a ship, as well as a vehicle.

REFERENCE SIGNS LIST

3: Engine (internal combustion engine), 7: Exhaust passage, 11: Chemical heat storage apparatus, 12, 12A, 12B: Reactor, 13: Absorber (reservoir), 14: $NH_3$ flow system (reaction medium flow system), 15: Exhaust gas supply system, 18: Reaction material, 25: Reaction material-filled portion, 26: Oil passage portion (heating object passage portion), 27: Exhaust gas passage portion, 30: Temperature sensor (temperature detection unit), 35: Heat generation control unit (or, heat generation controller), 36: Exhaust gas supply control unit, 37: Exhaust gas utilization unit (or, exhaust gas utilization controller), 40: Cover, 50: Heat exchanger, 51: Heat medium circulation system, 55: Heat medium pipe, 57: Heat medium circulation control unit, 58: Exhaust gas utilization unit, 60: Exhaust gas utilization unit, S: Vehicle (mobile machine).

The invention claimed is:

1. A chemical heat storage apparatus provided in a mobile machine in which an internal combustion engine is mounted and heating a heating object that comprises engine oil, the chemical heat storage apparatus comprising:
    a reactor disposed capable of exchanging heat with the heating object and including a reaction material generating heat by a chemical reaction with a reaction medium when the reaction medium is supplied, the reaction medium being desorbed from the reaction material when heat is given;
    a reservoir storing the reaction medium;
    a reaction medium flow system allowing the reaction medium to flow between the reactor and the reservoir;
    a heat generation controller that is programmed to control the reaction medium flow system such that heat is generated by a chemical reaction between the reaction medium and the reaction material and the heating object is heated when the internal combustion engine is started;
    a temperature sensor that detects the temperature of the exhaust gas discharged from the internal combustion engine;
    an exhaust gas supply system supplying the exhaust gas toward the reactor from an exhaust passage connected to the internal combustion engine; and
    an exhaust gas supply controller that is programmed to control the exhaust gas supply system such that the reaction medium is desorbed from the reaction material by the heat of the exhaust gas and the heating object is heated when the temperature of the exhaust gas detected by the temperature sensor reaches the predetermined temperature or more, wherein the reactor includes a heating object passage portion through which the heating object passes.

2. The chemical heat storage apparatus according to claim 1,
    wherein the reactor includes a reaction material-filled portion filled with the reaction material, the heating object passage portion being disposed adjacent to the reaction material-filled portion, and an exhaust gas passage portion through which the exhaust gas passes, the exhaust gas passage portion being disposed adjacent to the reaction material-filled portion and the heating object passage portion, and
    wherein the exhaust gas supply system supplies the exhaust gas from the exhaust passage to the exhaust gas passage portion.

3. The chemical heat storage apparatus according to claim 1,
    wherein the reactor includes a reaction material-filled portion filled with the reaction material, the heating object passage portion being disposed adjacent to the reaction material-filled portion, and an exhaust gas passage portion through which the exhaust gas passes, the exhaust gas passage portion being disposed adjacent to the reaction material-filled portion on a side opposite to the heating object passage portion across the reaction material-filled portion, and
    wherein the exhaust gas supply system supplies the exhaust gas from the exhaust passage to the exhaust gas passage portion.

4. The chemical heat storage apparatus according to claim 1,
    wherein the reactor includes a reaction material-filled portion filled with the reaction material the heating object passage portion being disposed adjacent to the reaction material-filled portion,
    and
    wherein the exhaust gas supply system supplies the exhaust gas from the exhaust passage into a cover covering the reactor.

5. A chemical heat storage apparatus provided in a mobile machine in which an internal combustion engine is mounted and heating a heating object that comprises engine oil, the chemical heat storage apparatus comprising:
    a reactor disposed capable of exchanging heat with the heating object and including a reaction material generating heat by a chemical reaction with a reaction medium when the reaction medium is supplied, the reaction medium being desorbed from the reaction material when heat is given;
    a reservoir storing the reaction medium;
    a reaction medium flow system allowing the reaction medium to flow between the reactor and the reservoir;
    a heat generation controller that is programmed to control the reaction medium flow system such that heat is generated by a chemical reaction between the reaction medium and the reaction material and the heating object is heated when the internal combustion engine is started;
    a temperature sensor that detects the temperature of the exhaust gas discharged from the internal combustion engine;
    a heat exchanger performing heat exchange between the exhaust gas and a heat medium;

a heat medium circulation system circulating the heat medium between the heat exchanger and the reactor;

a heat medium circulation controller that is programmed to control the heat medium circulation system such that the reaction medium is desorbed from the reaction material by heat of the heat medium and the heating object is heated when the temperature of the exhaust gas detected by the temperature sensor reaches the predetermined temperature or more, wherein the reactor includes a heating object passage portion through which the heating object passes.

6. The chemical heat storage apparatus according to claim 1, wherein the exhaust gas supply controller, in response to the temperature of the exhaust gas reaching the predetermined temperature, is configured to heat the heating object by opening a valve to enable the exhaust gas be supplied to the reactor.

7. The chemical storage apparatus according to claim 1, wherein the predetermined temperature is a temperature at which regeneration of the reaction material can be performed by the reaction medium being desorbed from the reaction material.

8. The chemical heat storage apparatus according to claim 5,
wherein the reactor includes a reaction material-filled portion filled with the reaction material,
wherein the heating object passage portion is disposed adjacent to the reaction material-filled portion,
wherein the heat medium circulation system has a pipe through which the heat medium flows, and
wherein a part of the pipe passes through the reaction material-filled portion.

9. A chemical heat storage apparatus provided in a mobile machine in which an internal combustion engine is mounted and heating a heating object that comprises engine oil, the chemical heat storage apparatus comprising:
a reactor disposed capable of exchanging heat with the heating object and including a reaction material generating heat by a chemical reaction with a reaction medium when the reaction medium is supplied, the reaction medium being desorbed from the reaction material when heat is given;
a reservoir storing the reaction medium;
a reaction medium flow system allowing the reaction medium to flow between the reactor and the reservoir; and
a heat generation controller that is programmed to control the reaction medium flow system such that heat is generated by a chemical reaction between the reaction medium and the reaction material and the heating object is heated when the internal combustion engine is started;
wherein the reactor includes a heating object passage portion through which the heating object passes,
wherein the reactor is arranged on an exhaust passage connected to the internal combustion engine and includes an exhaust gas passage portion through which the exhaust gas passes, and
wherein the reaction medium is desorbed from the reaction material by heat of exhaust gas discharged from the internal combustion engine and flowing through the exhaust gas passage portion being given to the reaction material, and the heating object is heated by the heat of the exhaust gas flowing through the exhaust gas passage portion, when a temperature of the exhaust gas reaches a predetermined temperature or more.

10. The chemical heat storage apparatus according to claim 9,
wherein the reactor further includes a reaction material-filled portion filled with the reaction material, the heating object passage portion being disposed adjacent to the reaction material-filled portion, and
wherein the exhaust gas passage portion is disposed adjacent to the reaction material-filled portion on a side opposite to the heating object passage portion across the reaction material-filled portion.

* * * * *